US010320170B2

(12) United States Patent
Hara et al.

(10) Patent No.: US 10,320,170 B2
(45) Date of Patent: Jun. 11, 2019

(54) ELECTRICAL CONNECTION STRUCTURE

(71) Applicant: Panasonic Intellectual Property Management Co., Ltd., Osaka (JP)

(72) Inventors: Anri Hara, Kanagawa (JP); Akira Inoue, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/084,417

(22) PCT Filed: Feb. 15, 2017

(86) PCT No.: PCT/JP2017/005492
§ 371 (c)(1),
(2) Date: Sep. 12, 2018

(87) PCT Pub. No.: WO2017/169228
PCT Pub. Date: Oct. 5, 2017

(65) Prior Publication Data
US 2019/0074677 A1 Mar. 7, 2019

(30) Foreign Application Priority Data

Mar. 28, 2016 (JP) ................................ 2016-064521
Mar. 28, 2016 (JP) ................................ 2016-064524

(51) Int. Cl.
*B60R 16/023* (2006.01)
*H02G 3/08* (2006.01)
(Continued)

(52) U.S. Cl.
CPC ........... *H02G 3/16* (2013.01); *B60R 16/0215* (2013.01); *B60R 16/0239* (2013.01); *H02G 3/081* (2013.01); *H02G 3/088* (2013.01)

(58) Field of Classification Search
CPC ... H05K 9/0037; B60R 16/0239; H02G 3/088
See application file for complete search history.

(56) References Cited

U.S. PATENT DOCUMENTS 6,542,384 B1 * 4/2003 Radu ....................... G06F 1/182 174/359
6,576,836 B2 * 6/2003 Erben .................... B60K 35/00 174/528

(Continued)

FOREIGN PATENT DOCUMENTS

JP 2014-204553 A 10/2014

OTHER PUBLICATIONS

International Search Report of PCT application No. PCT/JP2017/005492 dated Apr. 4, 2017.

*Primary Examiner* — Hung V Ngo
(74) *Attorney, Agent, or Firm* — Seed IP Law Group LLP

(57) ABSTRACT

An electrical connection structure includes a partition member provided with an opening, a casing, a plurality of connection members, and a mold. The partition member divides an inside of the casing into a first space and a second space. The plurality of connection members electrically connect a first electric circuit accommodated in the first space to a second electric circuit accommodated in the second space. The mold blocks the opening which penetrates the partition member. The partition member includes a first surface facing the first space, and a second surface that is reverse to the first surface and faces the second space. The plurality of connection members extend from the second space to the first space via the mold. A periphery of the surface of the mold that faces the second surface is in close contact with the second surface via a waterproof sealing member.

16 Claims, 21 Drawing Sheets

(51) Int. Cl.
*H02G 3/16* (2006.01)
*B60R 16/02* (2006.01)

(56) References Cited

U.S. PATENT DOCUMENTS

| | | | | |
|---|---|---|---|---|
| 7,067,734 | B2 * | 6/2006 | Abe | H01R 24/50 174/359 |
| 7,968,806 | B2 * | 6/2011 | Shelton | H05K 5/0013 174/50 |
| 8,760,879 | B1 * | 6/2014 | Platt | H05K 9/0037 361/600 |
| 8,785,771 | B2 * | 7/2014 | Dunkleberger | H04L 12/2829 174/50 |
| 8,842,421 | B2 * | 9/2014 | Gingrich | H01H 33/53 174/17 VA |
| 9,190,837 | B2 * | 11/2015 | Tollefsbol | H02H 9/005 |
| 2001/0019477 | A1 * | 9/2001 | Murasawa | H05K 9/0037 361/816 |
| 2002/0114138 | A1 * | 8/2002 | Laufer | H05K 7/20145 361/719 |
| 2015/0096800 | A1 * | 4/2015 | Gerhaeusser | H05K 5/0082 174/521 |
| 2016/0272073 | A1 | 9/2016 | Hosaka et al. | |

* cited by examiner

101

ELECTRICAL CONNECTION STRUCTURE

This application is a U.S. national stage application of the PCT International Application No. PCT/JP2017/005492 filed on Feb. 15, 2017, which claims the benefit of foreign priority of Japanese patent application No. 2016-064521 and No. 2016-064524 both filed on Mar. 28, 2016, the contents all of which are incorporated herein by reference.

TECHNICAL FIELD

The present disclosure relates to an electrical connection structure for electrically interconnecting two electric circuits.

BACKGROUND ART

Patent Literature 1, for example, discloses a structure in which a first electric circuit (for example, an inverter) and a second electric circuit (for example, a junction box) are disposed in one casing, and are electrically interconnected via one bus bar. In this structure, a partition member divides the inside of the casing into a first space and a second space, the first electric circuit is disposed in the first space, and the second electric circuit is disposed in the second space. The partition member is provided with an opening, and the bus bar passes through this opening.

CITATION LIST

Patent Literature

PTL 1: Unexamined Japanese Patent Publication No. 2014-204553

SUMMARY OF THE INVENTION

The present disclosure provides an electrical connection structure for electrically connecting, via a plurality of bus bars, two electric circuits that are disposed in spaces having different waterproof standard levels.

An electrical connection structure of one aspect of the present disclosure includes a partition member provided with an opening, a casing, a plurality of connection members, and a mold. The inside of the casing is divided into a first space and a second space by the partition member. The plurality of connection members electrically connects a first electric circuit accommodated in the first space with a second electric circuit accommodated in the second space. The mold blocks the opening in the partition member. The partition member includes a first surface facing the first space, and a second surface that is reverse to the first surface and faces the second space. The opening penetrates the first surface and second surface. The plurality of connection members extends from the second space to the first space via the mold. A periphery of the surface of the mold that faces the second surface is in close contact with the second surface via a waterproof sealing member.

In the electrical connection structure of the present disclosure, the number of components and the assembly man-hour required for waterproof can be reduced.

DESCRIPTION OF EMBODIMENTS

Prior to the description of the exemplary embodiments of the present disclosure, problems in a conventional technology are described briefly. In the structure of Patent Literature 1, a first space and a second space are formed in one waterproofed casing. Therefore, a waterproof structure is not needed between the first space and second space (namely, opening in the partition member). In contrast, when the waterproof standard levels required for the first space and second space are different from each other, the opening in the partition member must be sealed using a waterproof sealing member. Furthermore, when a first electric circuit is connected to a second electric circuit via a plurality of bus bars, the following structure is required: a plurality of openings corresponding to the bus bars are disposed in the partition member; and each opening is sealed using a waterproof sealing member. Therefore, increase in the number of components and the assembly man-hour is required.

Hereinafter, various exemplary embodiments of an electrical connection structure of the present disclosure are described with reference to the accompanying drawings. The electrical connection structure of the present disclosure includes casing 100 and its inner parts (for example, a bus bar or a mold), which are described in the following exemplary embodiments. Components similar to those in the precedent exemplary embodiment(s) are denoted by the same reference marks, and the descriptions of those components may be omitted.

First Exemplary Embodiment

Figure 1:
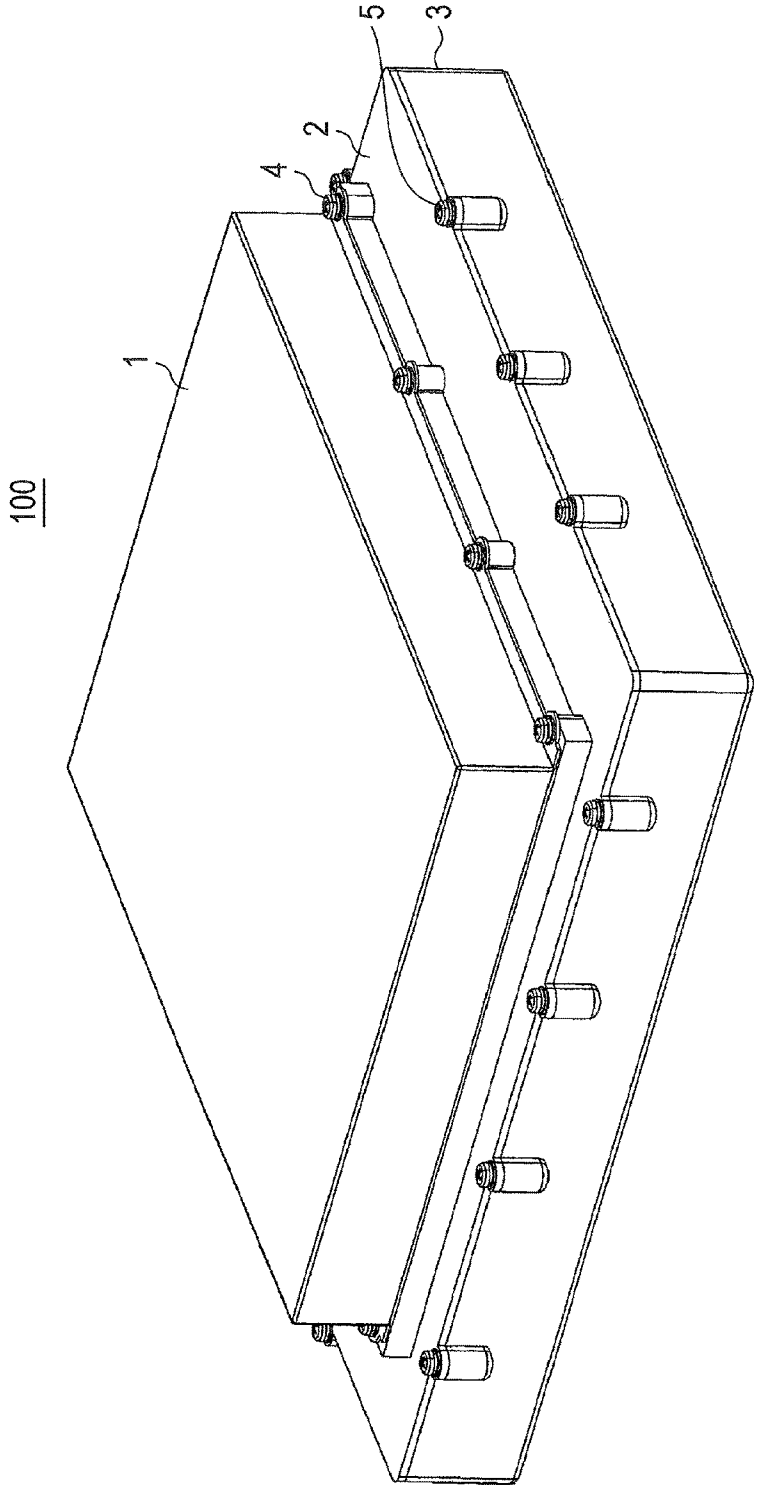
FIG. 1 is an external perspective view showing one example of a casing of an electrical connection structure in accordance with a first exemplary embodiment of the present disclosure.

FIG. 1 is an external perspective view showing one example of casing 100. First, the whole configuration of casing 100 in accordance with a first exemplary embodiment is described with reference to FIG. 1.

Casing 100 includes first box-shaped member 1 and second box-shaped member 3. The inside of casing 100 is divided into a first space (for example, internal space 6 described later) and a second space (internal space 14 described later) by plate-shaped member 2 as a partition member. First box-shaped member 1 is screwed to plate-shaped member 2 using screws 4. Plate-shaped member 2 is screwed to second box-shaped member 3 using screws 5. First box-shaped member 1, plate-shaped member 2, second box-shaped member 3 are made of metal, for example.

Figure 2:
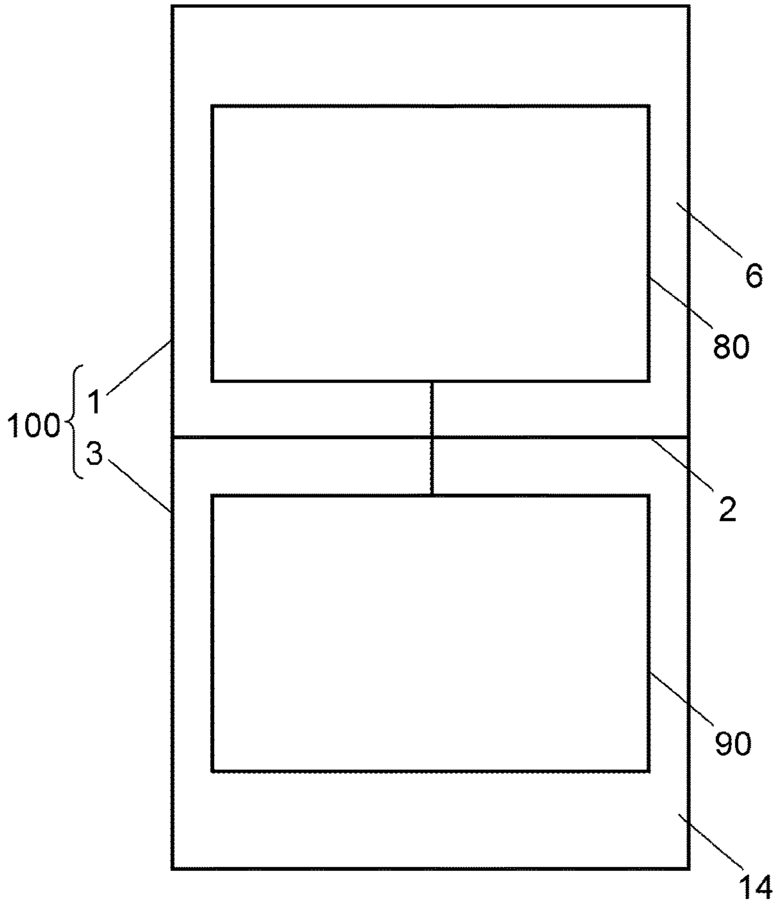
FIG. 2 is a conceptual diagram showing a first electric circuit and a second electric circuit that are accommodated in the casing of FIG. 1.

FIG. 2 is a conceptual diagram showing first electric circuit 80 and second electric circuit 90 that are accommodated in casing 100. First electric circuit 80 is accommodated in internal space 6 of first box-shaped member 1, and second electric circuit 90 is accommodated in internal space 14 of second box-shaped member 3. Internal space 6 is one example of the first space in casing 100, and internal space 14 is one example of the second space in casing 100. First electric circuit 80 transfers electric power between itself and second electric circuit 90.

Figure 3:
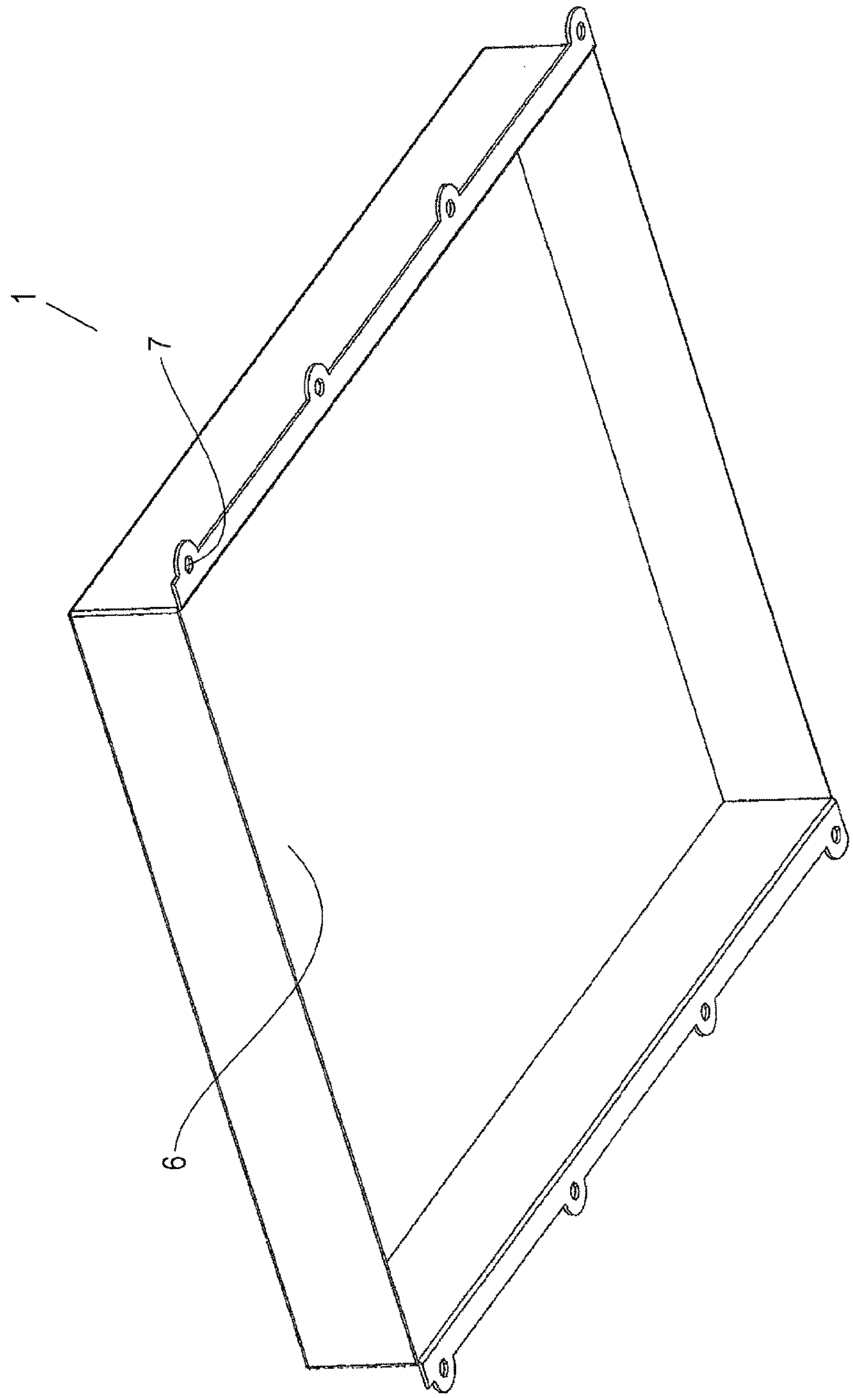
FIG. 3 is an external perspective view showing one example of a first box-shaped member of the electrical connection structure in accordance with the first exemplary embodiment of the present disclosure.

Next, first box-shaped member 1 is described with reference to FIG. 3. FIG. 3 is an external perspective view showing one example of first box-shaped member 1.

First box-shaped member 1 has a box shape (substantially rectangular prism shape) having one opening surface in the bottom thereof. The opening surface of first box-shaped member 1 is covered with first surface 2A (see FIG. 4) of plate-shaped member 2 described later.

In the present exemplary embodiment, for example, the waterproof standard level required for the first electric circuit is lower than that required for the second electric circuit. Therefore, internal space 6 of first box-shaped member 1 does not require a waterproof property higher than that of internal space 14 of second box-shaped member 3.

As shown in FIG. 3, first box-shaped member 1 is provided with through holes 7 into which screws 4 shown in FIG. 1 are inserted.

Figure 4:
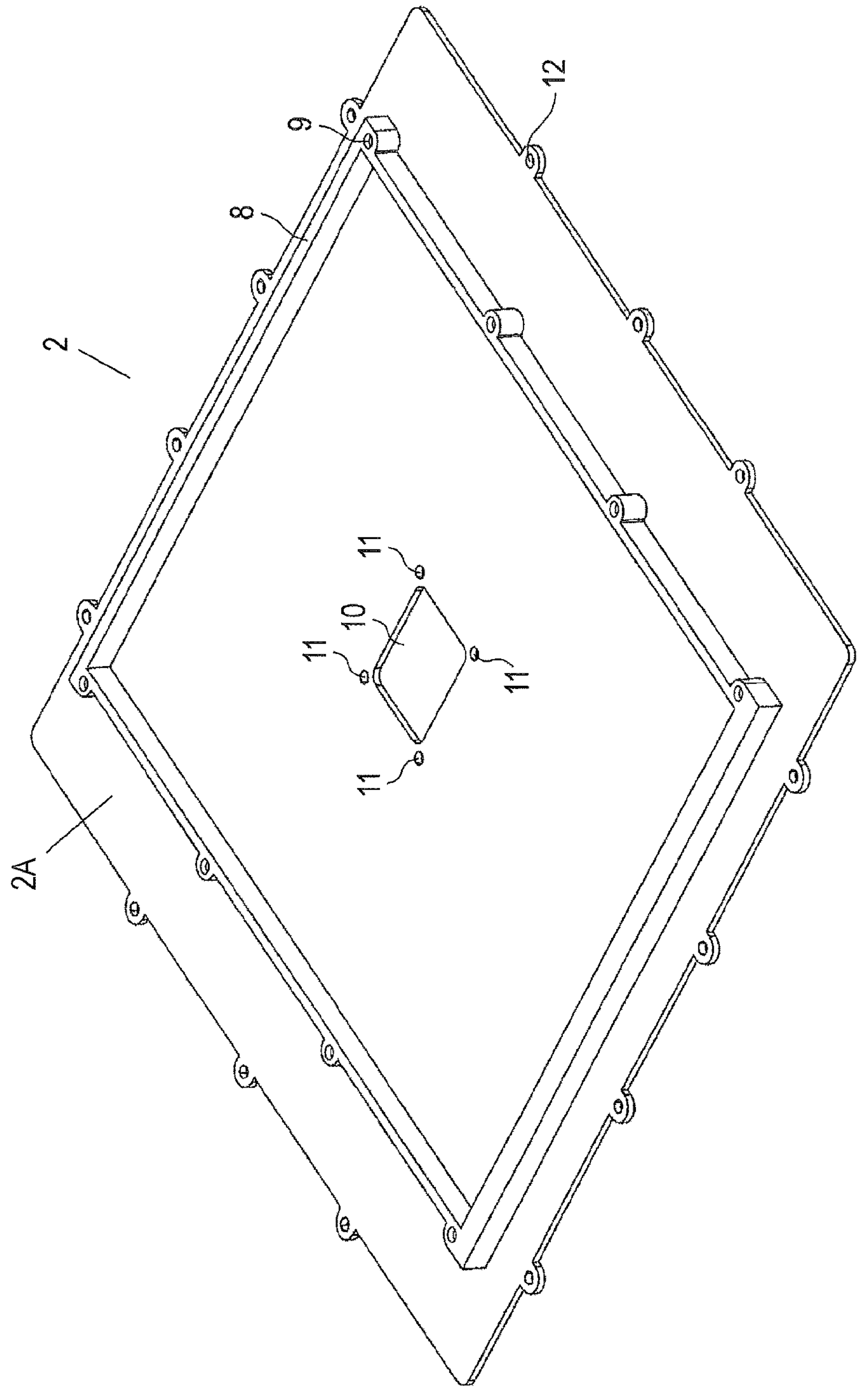
FIG. 4 is an external perspective view showing one example of a first surface of a plate-shaped member of the electrical connection structure in accordance with the first exemplary embodiment of the present disclosure.
Figure 5:
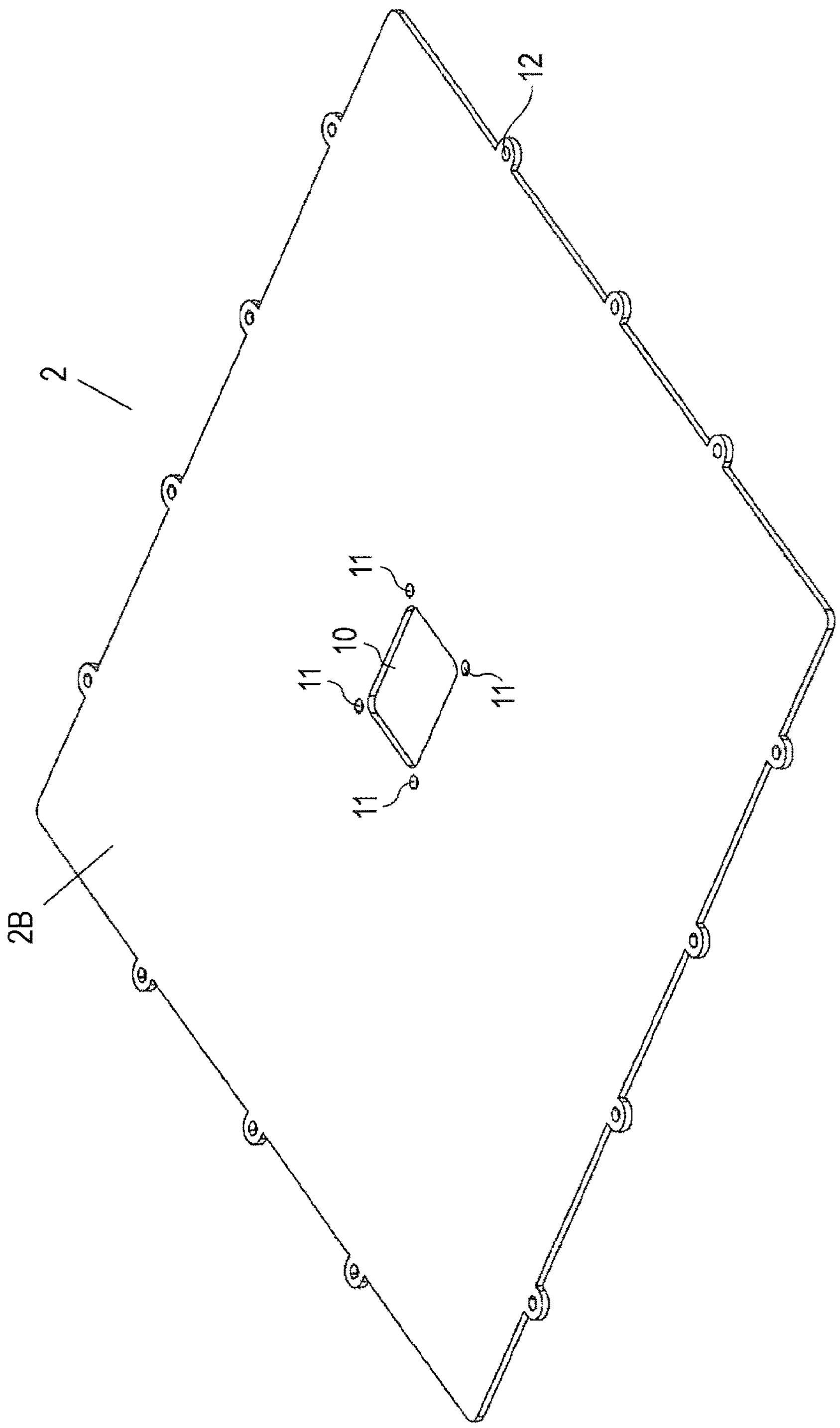
FIG. 5 is an external perspective view showing one example of a second surface of the plate-shaped member shown in FIG. 4.

Next, plate-shaped member 2 is described with reference to FIG. 4 and FIG. 5. FIG. 4 is an external perspective view showing one example of first surface 2A of plate-shaped member 2. FIG. 5 is an external perspective view showing one example of second surface 2B reverse to first surface 2A of plate-shaped member 2.

Plate-shaped member 2 shown in FIGS. 4 and 5 is a plate-shaped partition member that separates internal space 6 of first box-shaped member 1 from internal space 14 of second box-shaped member 3. Plate-shaped member 2 defines the bottom plane of first box-shaped member 1 and the top plane of second box-shaped member 3.

As shown in FIG. 4, on first surface 2A of plate-shaped member 2, frame body 8 is provided. Frame body 8 may be disposed integrally with first surface 2A, or may be disposed detachably from first surface 2A.

Frame body 8 is provided with screw receiving portions (screw holes) 9 into which screws 4 shown in FIG. 1 are inserted. Screws 4 are inserted into screw receiving portions 9 via through holes 7, thereby screwing and fixing first box-shaped member 1 to plate-shaped member 2.

As shown in FIGS. 4 and 5, plate-shaped member 2 is provided with opening 10 at a central portion thereof. Opening 10 penetrates first surface 2A through second surface 2B of plate-shaped member 2. Plate-shaped member 2 is provided with four through holes 11 at a periphery thereof around opening 10. Through holes 11 penetrate first surface 2A through second surface 2B of plate-shaped member 2.

As shown in FIGS. 4 and 5, an outer periphery of plate-shaped member 2 is provided with through holes 12 into which screws 5 shown in FIG. 1 are inserted.

Figure 6:
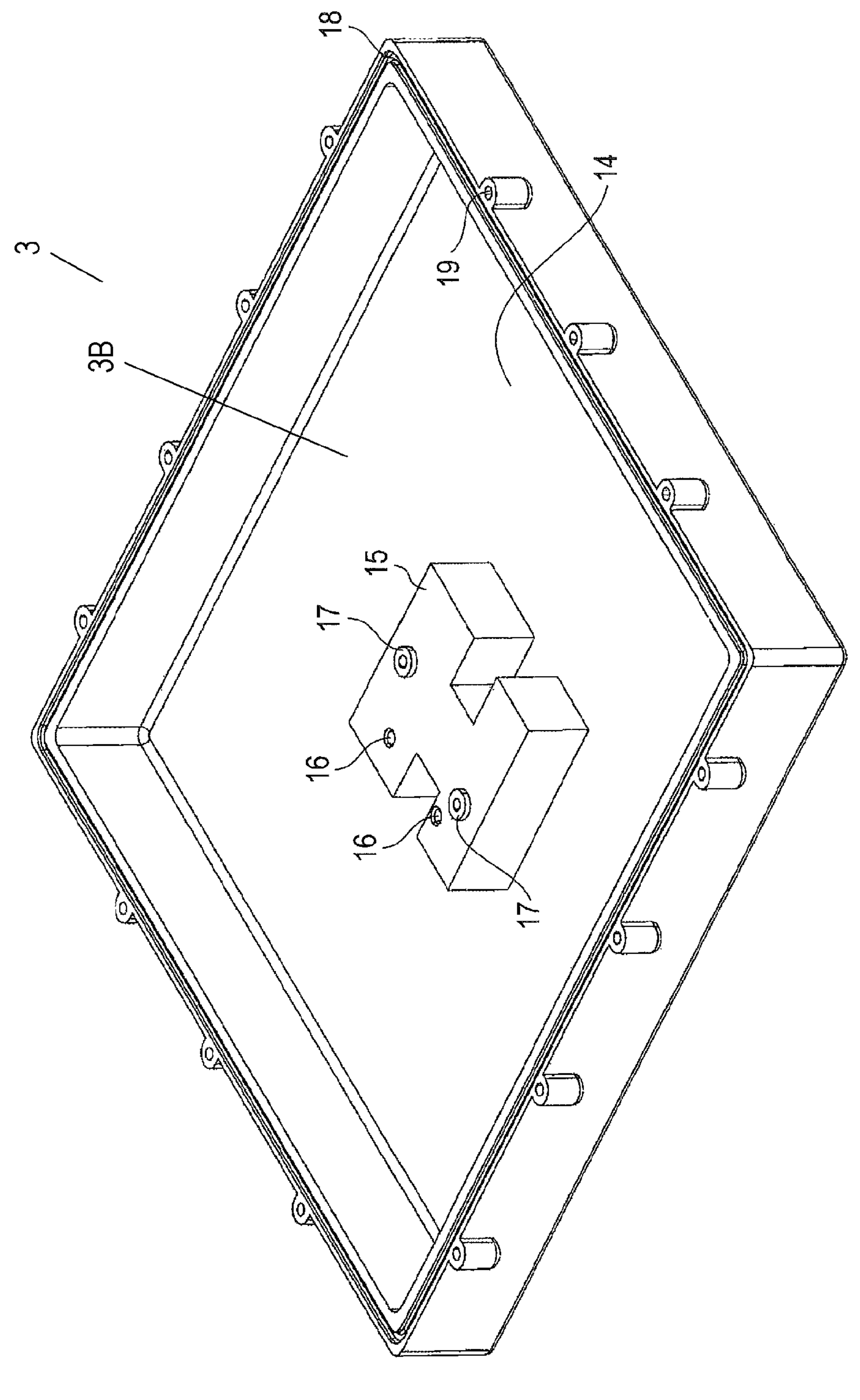
FIG. 6 is an external perspective view showing one example of a second box-shaped member of the electrical connection structure in accordance with the first exemplary embodiment of the present disclosure.

Next, second box-shaped member 3 is described with reference to FIG. 6. FIG. 6 is an external perspective view showing one example of second box-shaped member 3.

Second box-shaped member 3 has a box shape (substantially rectangular prism shape) having one opening surface in the top thereof. The opening surface of second box-shaped member 3 is covered with second surface 2B of above-mentioned plate-shaped member 2.

Internal space 14 of second box-shaped member 3 accommodates a second electric circuit (not shown). The second electric circuit transfers electric power between itself and the first electric circuit accommodated in internal space 6 of first box-shaped member 1.

In the present exemplary embodiment, for example, the waterproof standard level required for the second electric circuit is higher than that required for the first electric circuit. Therefore, internal space 14 of second box-shaped member 3 requires a waterproof property higher than that of internal space 6 of first box-shaped member 1.

As shown in FIG. 6, screw receiving member 15 is provided in internal space 14 of second box-shaped member 3 so as to project from bottom surface 3B of second box-shaped member 3. Screw receiving member 15 may be disposed integrally with bottom surface 3B, or may be disposed detachably from bottom surface 3B of second box-shaped member 3.

Screw receiving member 15 is provided with positioning-receiving portions 16. Positioning-receiving portions 16 are holes into which positioning protrusions 31 (see FIG. 9) of mold 28 described later are inserted, respectively.

Furthermore, screw receiving member 15 is provided with screw receiving portions 17 as screw holes into which screws 33 (see FIG. 10) described later are inserted, respectively.

As shown in FIG. 6, the periphery of the opening surface of second plate-shaped member 3 is provided with groove 18 in which waterproof sealing member 32 (see FIG. 11) described later is disposed.

The outer periphery of second plate-shaped member 3 is provided with screw receiving portions 19 as screw holes into which screws 5 shown in FIG. 1 are inserted, respectively. Screws 5 are inserted into screw receiving portions 19 via through holes 12 of plate-shaped member 2, respectively, thereby screwing and fixing plate-shaped member 2 to second plate-shaped member 3.

Figure 7:
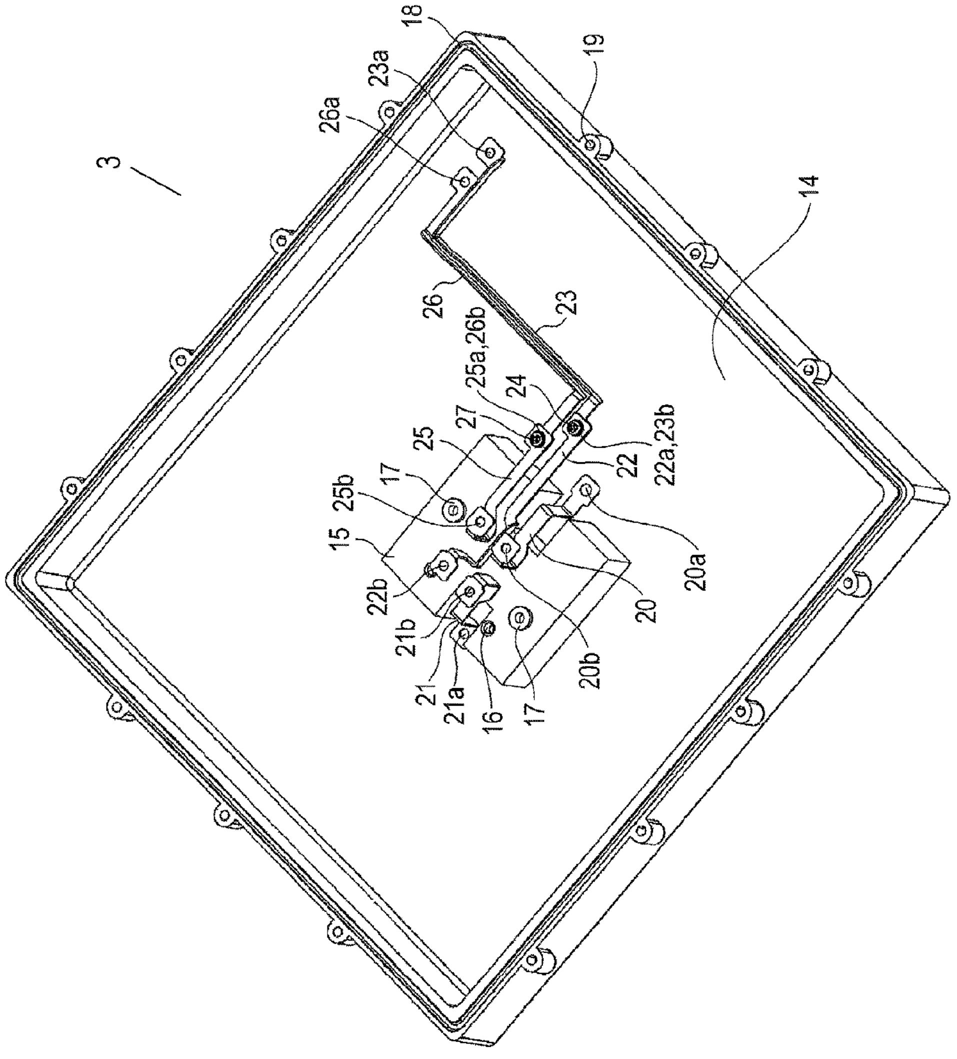
FIG. 7 is an external perspective view showing one example of bus bars disposed in the second box-shaped member shown in FIG. 6.

Next, a plurality of bus bars for electrically connecting the first electric circuit to the second electric circuit are described with reference to FIG. 7. FIG. 7 is an external perspective view showing one example of the plurality of bus bars disposed in internal space 14 of second box-shaped member 3. In FIG. 7, for convenience in description, mold 28 described later is not shown.

Bus bars 20, 21, 22, 23, 25, and 26 are disposed in internal space 14 of second box-shaped member 3.

First, bus bar 20 is described. Bus bar 20 is provided with through hole 20*a* at a first end thereof, and through hole 20*b* at a second end thereof. A screw (not shown) is inserted into through hole 20*a*. This screw is inserted into a screw receiving portion (not shown) of the second electric circuit via through hole 20*a*. As a result, bus bar 20 is screwed to the second electric circuit. A screw (not shown) is inserted into through hole 20*b*. For example, this screw is inserted into through hole 20*b*, and into a through hole (not shown) that is disposed in the first electric circuit or in a bus bar (not shown) electrically connected to the first electric circuit. As a result, bus bar 20 is screwed to the first electric circuit.

Next, bus bar 21 is described. Bus bar 21 is provided with through hole 21*a* at a first end thereof, and through hole 21*b* at a second end thereof. A screw (not shown) is inserted into through hole 21*a*. This screw is inserted into a screw receiving portion (not shown) of the second electric circuit via through hole 21*a*. As a result, bus bar 21 is screwed to the second electric circuit. A screw (not shown) is inserted into through hole 21*b*. For example, this screw is inserted into through hole 21*b*, and into a through hole (not shown) that is disposed in the first electric circuit or in a bus bar (not shown) electrically connected to the first electric circuit. As a result, bus bar 21 is screwed to the first electric circuit.

Next, bus bars 22 and 23 are described. Bus bar 22 is provided with through hole 22*a* at a first end thereof, and through hole 22*b* at a second end thereof. Bus bar 23 is provided with through hole 23*a* at a first end thereof, and through hole 23*b* at a second end thereof. Screw 24 is inserted into through hole 22*a* and through hole 23*b*. Thus, bus bar 22 is connected to bus bar 23. Note that bus bar 22 and bus bar 23 may be formed integrally. A screw (not shown) is inserted into through hole 23*a*. This screw is inserted into a screw receiving portion (not shown) of the second electric circuit via through hole 23*a*. As a result, bus bar 23 is screwed to the second electric circuit. A screw (not shown) is inserted into through hole 22*b*. For example, this screw is inserted into through hole 22*b*, and into a through hole (not shown) that is disposed in the first electric circuit or in a bus bar (not shown) electrically connected to the first electric circuit. As a result, bus bar 22 is screwed to the first electric circuit.

Next, bus bars 25 and 26 are described. Bus bar 25 is provided with through hole 25*a* at a first end thereof, and through hole 25*b* at a second end thereof. Bus bar 26 is provided with through hole 26*a* at a first end thereof, and through hole 26*b* at a second end thereof. Screw 27 is inserted into through hole 25*a* and through hole 26*b*. Thus, bus bar 25 is connected to bus bar 26. Note that bus bar 25 and bus bar 26 may be formed integrally. A screw (not shown) is inserted into through hole 26*a*. This screw is inserted into a screw receiving portion (not shown) of the second electric circuit via through hole 26*a*. As a result, bus bar 26 is screwed to the second electric circuit.

In order to optimize the circuit design and layout of the second electric circuit, a screw receiving portion of the second electric circuit electrically connected to the first electric circuit is sometimes disposed at a position separate from opening 10. Therefore, wires are extended using bus bars 23 and 26. In other words, bus bar 20 and bus bar 21 are disposed symmetrically, and have the same length. On the other hand, bus bar 22 is longer than each of bus bars 20 and 21, and bus bar 25 is equal in length to or shorter than each of bus bars 20 and 21. Thus, the length of at least one of bus bars 20 to 22 and 25 may be different from those of the other bus bars.

A screw (not shown) is inserted into through hole 25*b*. For example, this screw is inserted into through hole 25*b*, and into a through hole (not shown) that is disposed in the first electric circuit or in a bus bar (not shown) electrically connected to the first electric circuit. As a result, bus bar 25 is screwed to the first electric circuit.

Thus, bus bars 20, 21, 22, 23, 25, and 26 as a plurality of connection members electrically connect the first electric circuit accommodated in internal space 6 of casing 100 to the second electric circuit accommodated in internal space 14.

Bus bars 20, 21, 22, and 25 are partially buried in a resin (for example, polybutylene terephthalate resin or nylon) having an insulation property and heat resistance. In the present exemplary embodiment, a resin molded by partially burying bus bars 20, 21, 22, and 25 is called "mold 28". Thus, bus bars 20, 21, 22, and 25 are insert-molded using mold 28.

Figure 8:
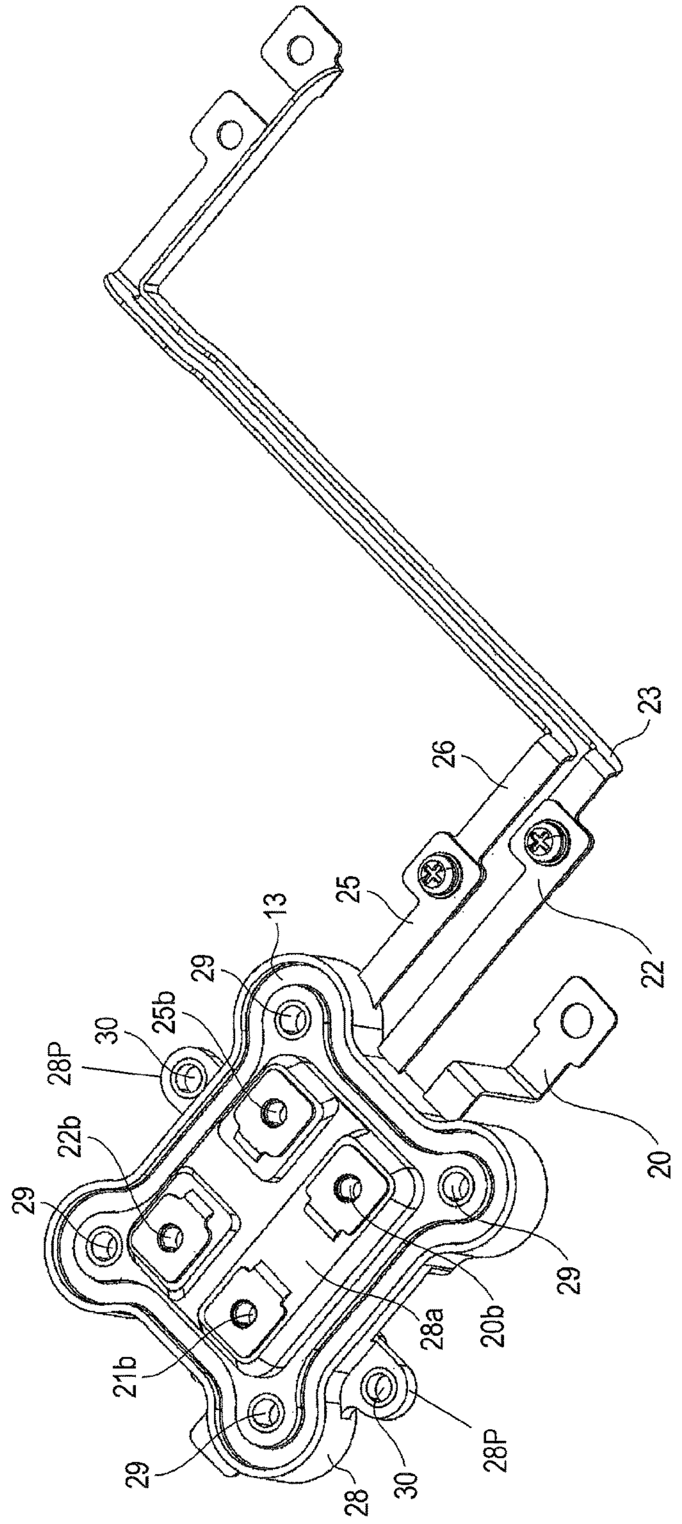
FIG. 8 is an external perspective view showing one example of a mold of the electrical connection structure in accordance with the first exemplary embodiment of the present disclosure.
Figure 9:
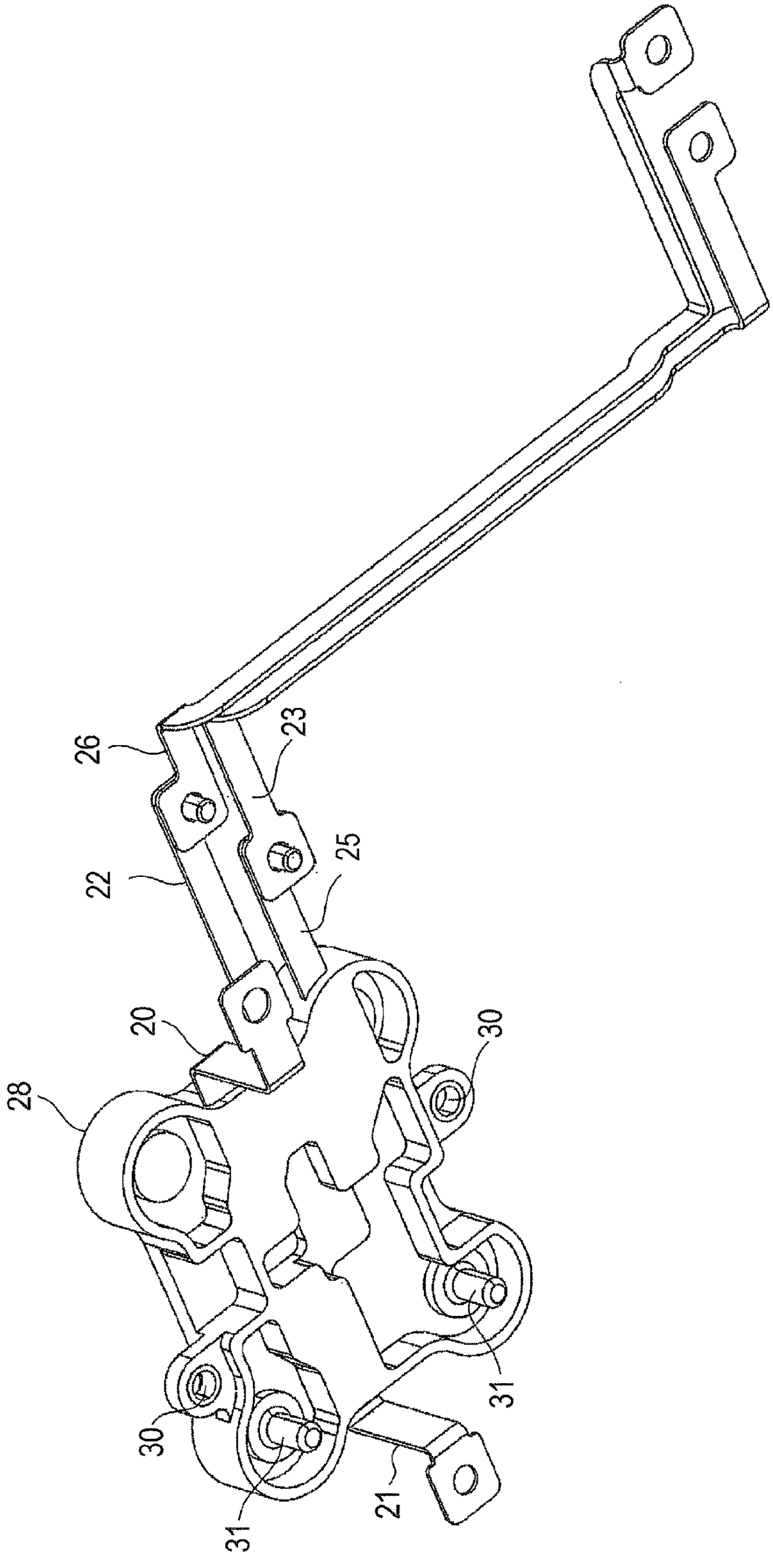
FIG. 9 is an external perspective view showing a bottom side of the mold shown in FIG. 8.

Next, mold 28 is described with reference to FIGS. 8 and 9. FIG. 8 is an external perspective view showing the top side of mold 28. FIG. 9 is an external perspective view showing the bottom side of mold 28.

As shown in FIGS. 8 and 9, mold 28 covers a part of bus bars 20, 21, 22, and 25. The term "a part" shows a portion below the formed portions of through holes 20*b*, 21*b*, 22*b*, and 25*b*, for example, and includes at least a portion inserted into opening 10.

As shown in FIG. 8, mold 28 is provided with screw receiving portions 29 in the top surface thereof, as the screw holes into which screws 35 (see FIG. 13) described later are inserted, respectively. The top surface of mold 28 means the surface that faces second surface 2B of plate-shaped member 2.

Mold 28 includes projection 28*a* on the top surface thereof. Projection 28*a* projects upward more than the opening surfaces of screw receiving portions 29 do, blocks opening 10 of plate-shaped member 2, and penetrates plate-shaped member 2. The formed portions of through holes 20*b*, 21*b*, 22*b*, and 25*b* in projection 28*a* are exposed to the outside (see FIG. 12 and FIG. 13).

Furthermore, mold 28 is provided with groove 13 in the top surface thereof along the outer periphery of the top surface thereof. In groove 13, waterproof sealing member 34 (see FIG. 11) described later is disposed. Groove 13 is disposed on the outside of the outer periphery of projection 28*a* in mold 28 and is disposed on the outside of screw receiving portions 29 in mold 28.

As shown in FIG. 9, mold 28 includes positioning protrusions 31 on the bottom surface thereof. Positioning protrusions 31 are inserted into above-mentioned positioning-receiving portions 16 (see FIG. 6), respectively.

As shown in FIGS. 8 and 9, mold 28 includes projections 28P on the side surface thereof. Projections 28P are respectively provided with through holes 30 (screw holes) into which screws 33 (see FIG. 10) described layer are inserted, respectively.

Figure 10:
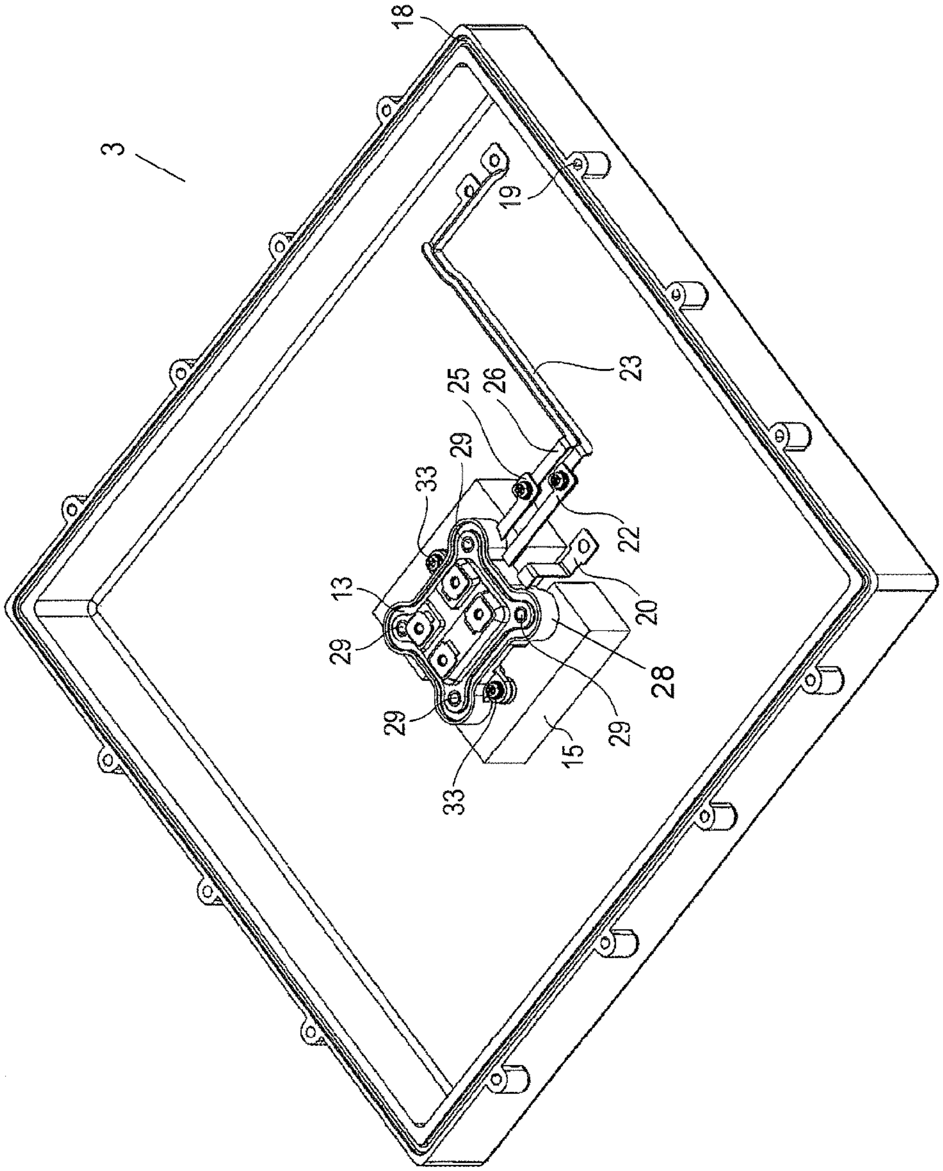
FIG. 10 is an external perspective view showing the state in which the mold shown in FIG. 8 is screwed to the second box-shaped member shown in FIG. 6.

Next, a screwing structure of mold 28 and second box-shaped member 3 is described with reference to FIG. 10. FIG. 10 is an external perspective view showing the state in which mold 28 is screwed to second box-shaped member 3.

First, positioning protrusions 31 shown in FIG. 9 are inserted into positioning-receiving portions 16 shown in FIG. 6, respectively. As shown in FIG. 10, screws 33 are inserted into screw receiving portions 17 shown in FIG. 6 via through holes 30 shown FIG. 9, respectively. Thus, mold 28 is screwed to second box-shaped member 3. Each of the number of through holes 30 and the number of screw receiving portions 17 is two, but may be one or more.

Figure 11:
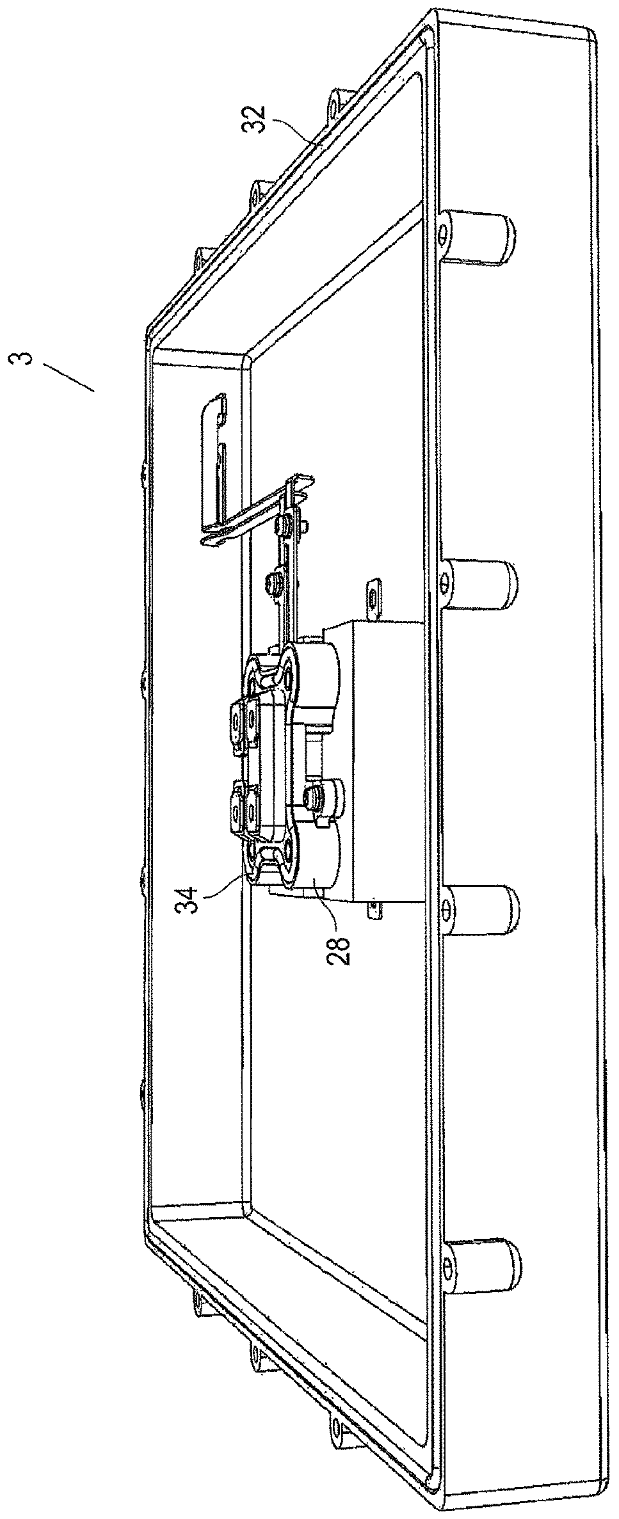
FIG. 11 is an external perspective view showing the state in which waterproof sealing members are disposed on the second box-shaped member shown in FIG. 6 and on the mold shown in FIG. 8.
Figure 12:
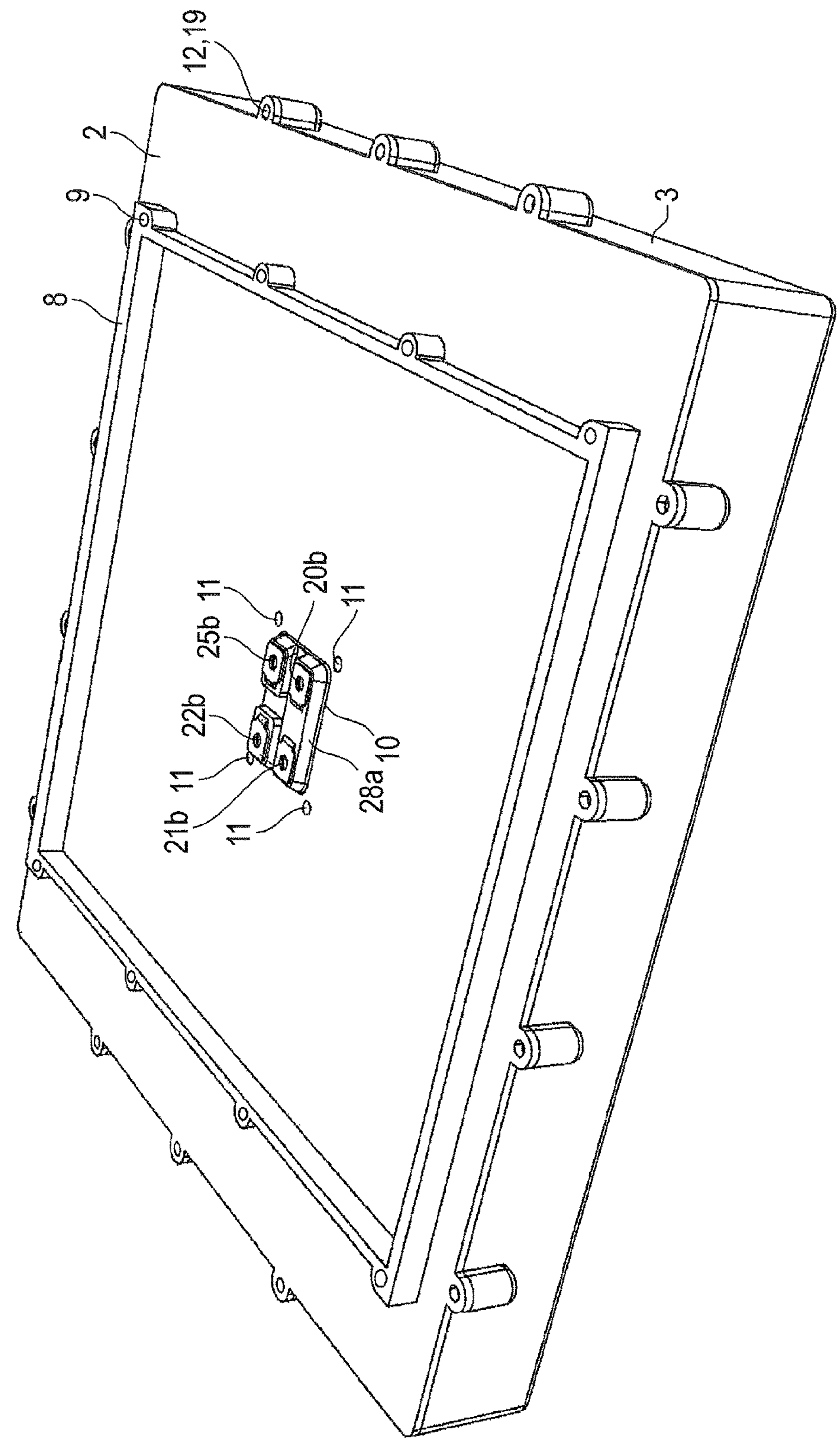
FIG. 12 is an external perspective view showing the state in which the plate-shaped member shown in FIG. 4 is mounted on the second box-shaped member shown in FIG. 6.
Figure 13:
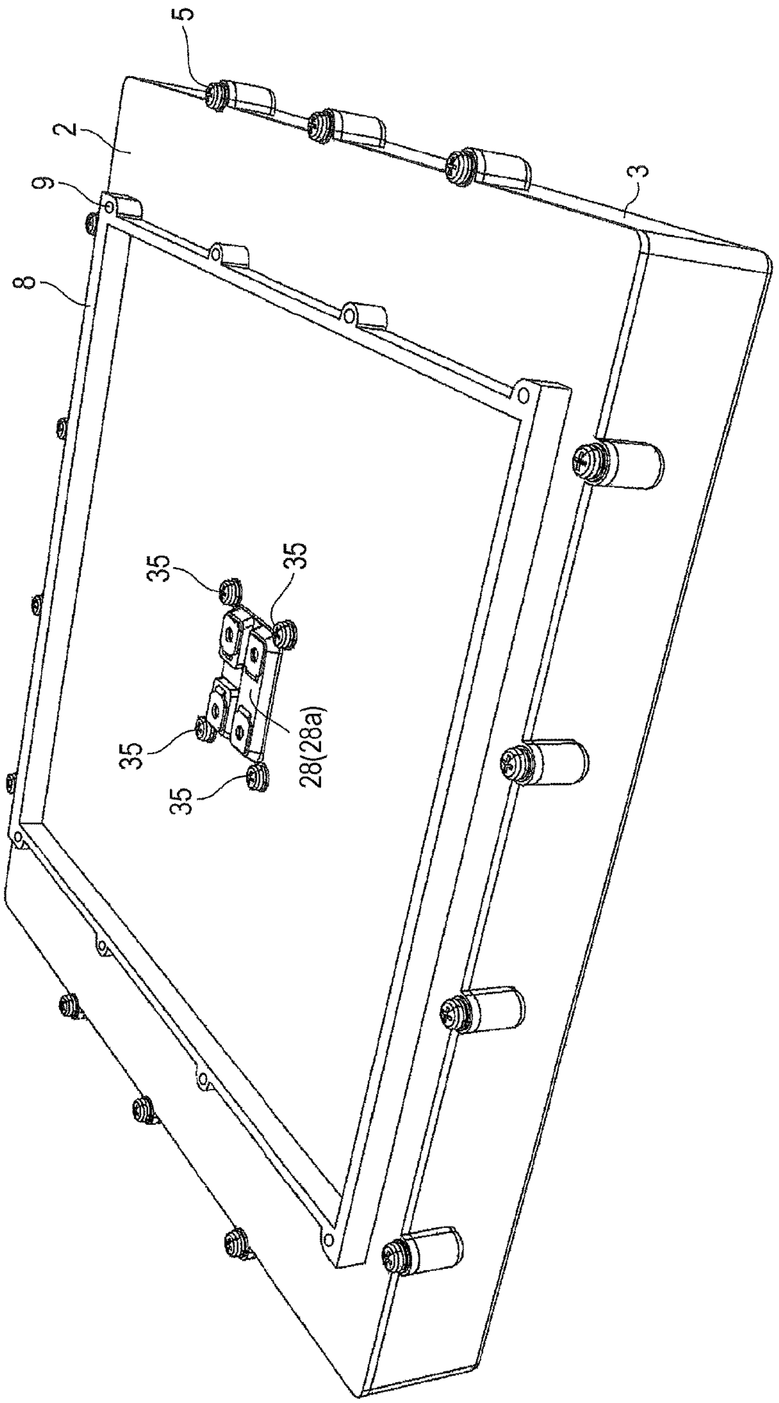
FIG. 13 is an external perspective view showing the state in which the mold shown in FIG. 8 is screwed to the plate-shaped member shown in FIG. 4 and the plate-shaped member shown in FIG. 4 is screwed to the second box-shaped member shown in FIG. 6.
Figure 14:
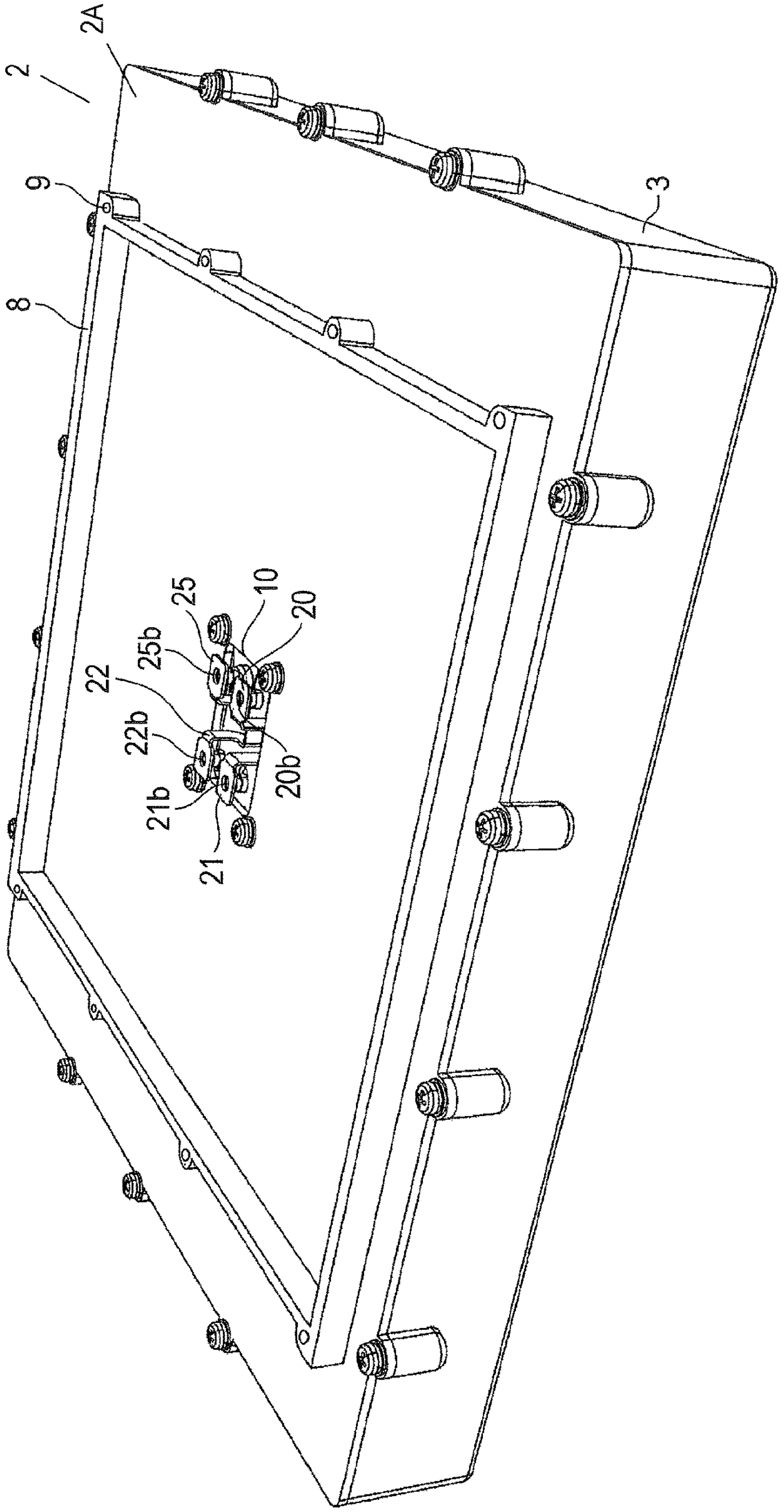
FIG. 14 is an external perspective view in which the mold shown in FIG. 13 is omitted.

Next, a screwing structure of second box-shaped member 3 and plate-shaped member 2 is described with reference to FIG. 10 to FIG. 14. FIG. 11 is an external perspective view showing the state in which waterproof sealing members 32 and 34 are disposed to second box-shaped member 3 and mold 28, respectively. FIG. 12 is an external perspective view showing the state in which plate-shaped member 2 is mounted on second box-shaped member 3. FIG. 13 is an external perspective view showing the state in which mold 28 is screwed and fixed to plate-shaped member 2, and plate-shaped member 2 is screwed and fixed to second box-shaped member 3. FIG. 14 is an external perspective view in which mold 28 shown in FIG. 13 is omitted.

After mold 28 is screwed to second box-shaped member 3 with screws 33 as shown in FIG. 10, waterproof sealing member 34 is disposed in (fitted into) groove 13 shown in FIG. 10, as shown in FIG. 11. Waterproof sealing member 32 is disposed in groove 18 shown in FIG. 10. Waterproof sealing members 32 and 34 are made of elastic members, for example silicon or ethylene-propylene rubber.

Waterproof sealing members 34 and 32 disposed in grooves 13 and 18 protrude upward from grooves 13 and 18 as shown in FIG. 11, respectively. The protruding portions are deformed (or compressed) by plate-shaped member 2 described later, by screwing plate-shaped member 2 to second box-shaped member 3 and by screwing mold 28 to plate-shaped member 2. Thus, second surface 2B of plate-shaped member 2 comes into close contact with the periphery of the opening surface of second box-shaped member 3 without a gap. Furthermore, second surface 2B of plate-shaped member 2 comes into close contact with the top surface (surface other than projection 28*a*) of mold 28 without a gap.

After waterproof sealing members 32 and 34 are arranged as shown in FIG. 11, plate-shaped member 2 is disposed on second box-shaped member 3 as shown in FIG. 12. At this time, projection 28*a* is inserted into opening 10 in plate-shaped member 2, and blocks opening 10. At this time, the positions of through holes 11 in plate-shaped member 2 coincide with the positions of screw receiving portions 29 (see FIG. 8 and FIG. 10) in mold 28, respectively. The positions of through holes 12 in plate-shaped member 2 coincide with the positions of screw receiving portions 19 in second box-shaped member 3, respectively.

After plate-shaped member 2 is mounted on second box-shaped member 3 as shown in FIG. 12, plate-shaped member 2 is screwed to second box-shaped member 3 with screws 5, and mold 28 is screwed to plate-shaped member 2 with screws 35 as shown in FIG. 13. Specifically, by respectively inserting screws 5 into through holes 12 and screw receiving portions 19 that are shown in FIG. 12, plate-shaped member 2 is screwed to second box-shaped member 3. Furthermore, by respectively inserting screws 35 into through holes 11 shown in FIG. 12 and into screw receiving portions 29 (see FIG. 8 and FIG. 10), mold 28 is screwed to plate-shaped member 2.

Each of the number of through holes 11 and the number of screw receiving portions 29 is four, but may be one or more.

As shown in FIG. 14, bus bars 20, 21, 22, and 25 are inserted into opening 10. Each of the formed portions of through hole 20*b* in bus bar 20, through hole 21*b* in bus bar 21, through hole 22*b* in bus bar 22, and through hole 25*b* in bus bar 25 is positioned above first surface 2A of plate-shaped member 2. In other words, when first box-shaped member 1 is attached to plate-shaped member 2, each formed portion is positioned in internal space 6 of first box-shaped member 1 shown in FIG. 3.

Next, a screwing structure of first box-shaped member 1 and plate-shaped member 2 is described with reference to FIG. 1.

After plate-shaped member 2 is screwed to second box-shaped member 3 and mold 28 is screwed to plate-shaped member 2 as shown in FIG. 13, first box-shaped member 1 is mounted on plate-shaped member 2 as shown in FIG. 1. At this time, the positions of through holes 7 in first box-shaped member 1 (see FIG. 3) coincide with the positions of screw receiving portions 9 (see FIG. 13) formed in frame body 8 of plate-shaped member 2, respectively.

Then, by respectively inserting screws 4 into through holes 7 shown in FIG. 3 and into screw receiving portions 9 shown in FIG. 13, first box-shaped member 1 is screwed to plate-shaped member 2. Thus, casing 100 shown in FIG. 1 is completed.

As discussed above, in the present exemplary embodiment, the plurality of bus bars 20, 21, 22, and 25 are inserted into opening 10. Mold 28 formed by insert-molding the bus bars blocks (or closes) opening 10. Mold 28 is in close contact with plate-shaped member 2 via waterproof sealing member 34. Second box-shaped member 3 is in close contact with plate-shaped member 2 via waterproof sealing member 32. In other words, thus, the plurality of bus bars 20, 21, 22, and 25 are collected and inserted into one opening 10. Therefore, even when a plurality of bus bars need to be passed through spaces (internal spaces 6 and 14) having different waterproof standard levels, the waterproof property can be kept. Compared with the case that openings corresponding to the plurality of bus bars are provided and the openings are blocked (waterproofed), the number of components and the assembly man-hour required for waterproof can be reduced.

Second Exemplary Embodiment

Next, a second exemplary embodiment is described. In the first exemplary embodiment, mold 28 is screwed to second box-shaped member 3 with screws 33, and mold 28 is screwed to plate-shaped member 2 with screws 35. In this case, mold 28 is fastened from both sides in the vertical direction. Therefore, there is a risk that a gap occurs between plate-shaped member 2 and mold 28 to reduce the waterproof property of internal space 14. Therefore, a method may be considered in which screwing of mold 28 to second box-shaped member 3 with screws 33 is not performed and only screwing of mold 28 to plate-shaped member 2 with screws 35 is performed. In other words, a method is considered in which downward fastening is not performed and only upward fastening is performed. However, bus bars 20, 21, 22, 23, 25, and 26 that are connected and fixed to the second electric circuit have high rigidity. Therefore, when mold 28 is lifted upward by the upward fastening, these bus bars and a predetermined position of the second electric circuit can receive loads.

Hereinafter, the configuration of an electrical connection structure in accordance with the second exemplary embodiment for addressing such problems will be described.

Figure 15:
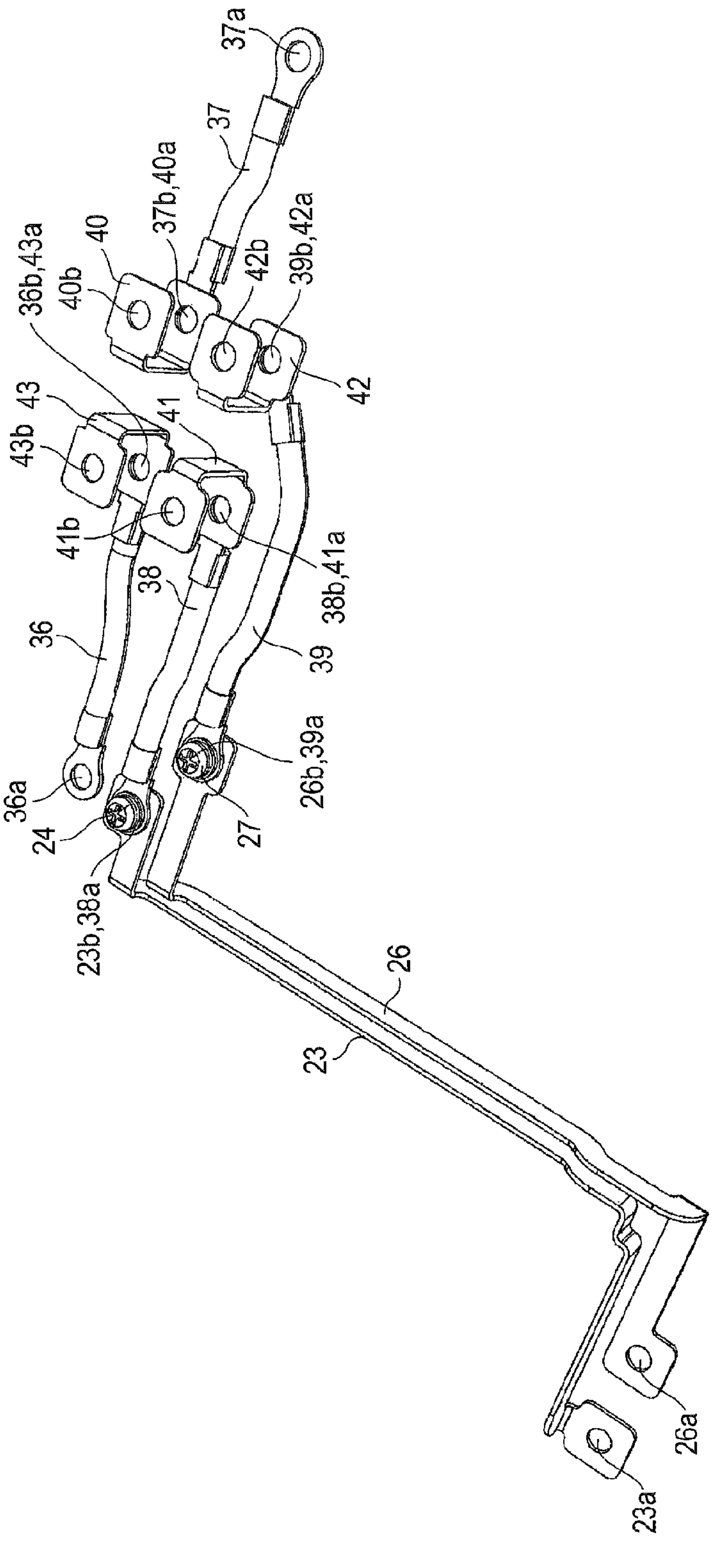
FIG. 15 is an external perspective view showing one example of bus bars and wire harnesses in an electrical connection structure in accordance with a second exemplary embodiment of the present disclosure.
Figure 16:
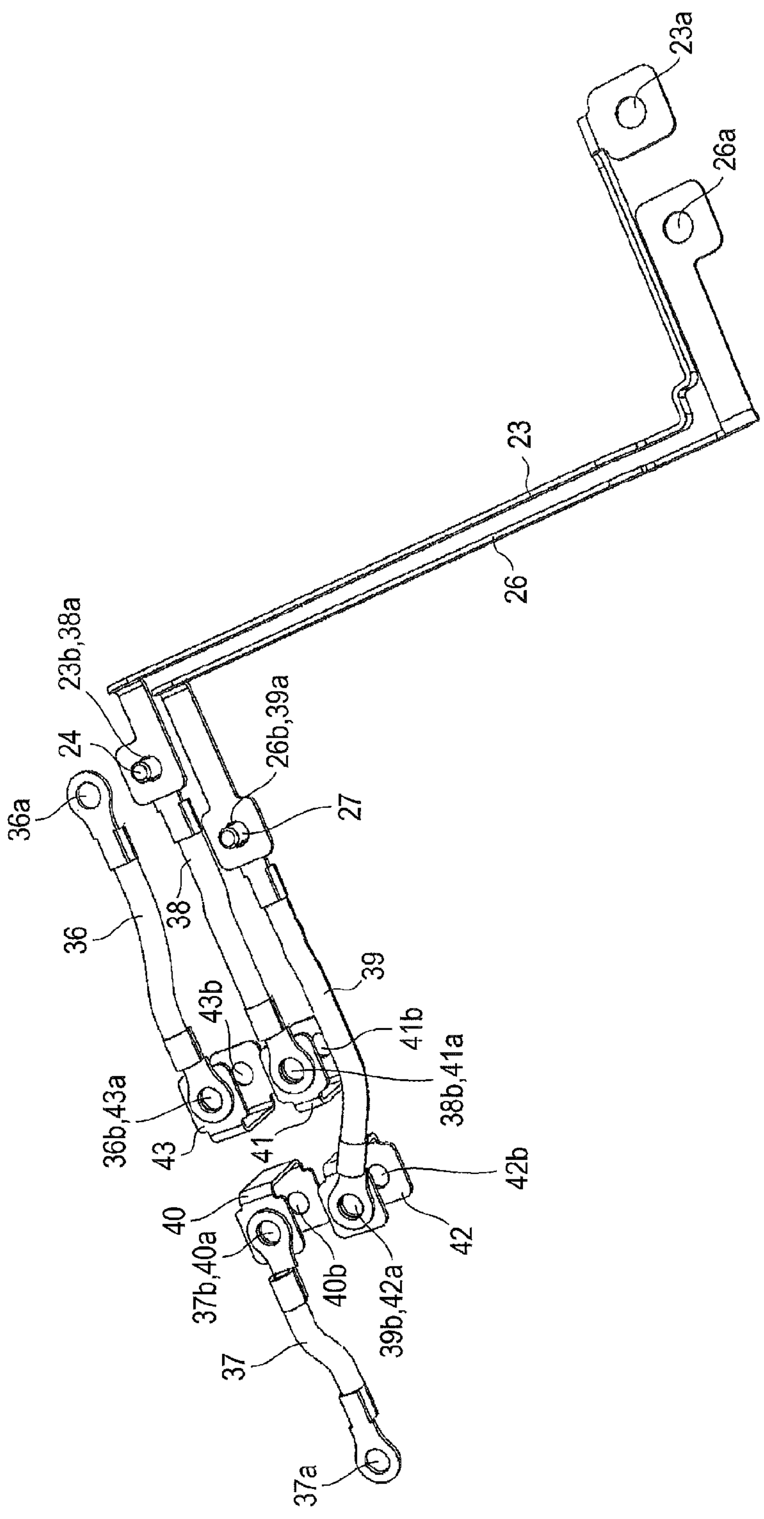
FIG. 16 is an external perspective view showing bottom sides of the bus bars and the wire harnesses shown in FIG. 15.

First, one example of a connection configuration of bus bars and wire harnesses in accordance with the present exemplary embodiment is described with reference to FIGS. 15 and 16. FIGS. 15 and 16 are external perspective views of bus bars 23, 26, and 40 to 43 and wire harnesses 36 to 39. Wire harnesses 36 to 39 have flexibility, and bus bars 23, 26, and 40 to 43 do not have flexibility.

First, wire harness 36 and bus bar 43 are described. Wire harness 36 is provided with through hole 36*a* at a first end thereof, and through hole 36*b* at a second end thereof. Bus bar 43 is provided with through hole 43*a* at a first end thereof, and through hole 43*b* at a second end thereof. A screw (not shown) is inserted into through hole 36*a*. This screw is inserted into a screw receiving portion (not shown) of the second electric circuit via through hole 36*a*, thereby screwing and fixing wire harness 36 to the second electric circuit. Screw 44 (see FIG. 18) is inserted into through hole 36*b* and through hole 43*a*. Thus, wire harness 36 is connected to bus bar 43. A screw (not shown) is inserted into through hole 43*b*. For example, this screw is inserted into through hole 43*b*, and into a through hole (not shown) that is disposed in the first electric circuit or in a bus bar (not shown) electrically connected to the first electric circuit. In this configuration, bus bar 43 is screwed and fixed to the first electric circuit.

Next, wire harness 37 and bus bar 40 are described. Wire harness 37 is provided with through hole 37*a* at a first end thereof, and through hole 37*b* at a second end thereof. Bus bar 40 is provided with through hole 40*a* at a first end thereof, and through hole 40*b* at a second end thereof. A screw (not shown) is inserted into through hole 37*a*. This screw is inserted into a screw receiving portion (not shown) of the second electric circuit via through hole 37*a*, thereby screwing and fixing wire harness 37 to the second electric circuit. Screw 45 (see FIG. 18) is inserted into through hole 37*b* and through hole 40*a*. Thus, wire harness 37 is connected to bus bar 40. A screw (not shown) is inserted into through hole 40*b*. For example, this screw is inserted into through hole 40*b*, and into a through hole (not shown) that is disposed in the first electric circuit or in a bus bar (not shown) electrically connected to the first electric circuit. Thus, bus bar 40 is screwed and fixed to the first electric circuit.

Next, wire harness 38 and bus bars 41 and 23 are described. Wire harness 38 is provided with through hole 38*a* at a first end thereof, and through hole 38*b* at a second end thereof. Bus bar 41 is provided with through hole 41*a* at a first end thereof, and through hole 41*b* at a second end thereof. Screw 24 is inserted into through hole 38*a* and into through hole 23*b* in bus bar 23. Thus, wire harness 38 is connected to bus bar 23. Screw 46 (see FIG. 18) is inserted into through hole 38*b* and through hole 41*a*. Thus, wire harness 38 is connected to bus bar 41. A screw (not shown) is inserted into through hole 41*b*. For example, this screw is inserted into through hole 41*b*, and into a through hole (not shown) that is disposed in the first electric circuit or in a bus bar (not shown) electrically connected to the first electric circuit. Thus, bus bar 41 is screwed and fixed to the first electric circuit.

Thus, bus bar 41, wire harness 38, and bus bar 23 constitute one of the connection members that electrically connect the first electric circuit to the second electric circuit. Bus bar 41 is a first bus bar that is inserted into opening 10 and is connected to the first electric circuit. Bus bar 23 is a second bus bar connected to the second electric circuit. Wire harness 38 has a first end connected to bus bar 41 and a second end connected to bus bar 23. Mold 28 covers a part of bus bar 41 as shown in FIG. 17.

Next, wire harness 39 and bus bars 42 and 26 are described. Wire harness 39 is provided with through hole 39*a* at a first end thereof, and through hole 39*b* at a second end thereof. Bus bar 42 is provided with through hole 42*a* at a first end thereof, and through hole 42*b* at a second end thereof. Screw 27 is inserted into through hole 39*a* and into through hole 26*b* in bus bar 26. Thus, wire harness 39 is connected to bus bar 26. Screw 47 (see FIG. 18) is inserted into through hole 39*b* and through hole 42*a*. Thus, wire harness 39 is connected to bus bar 42. A screw (not shown) is inserted into through hole 42*b*. For example, this screw is inserted into through hole 42*b*, and into a through hole (not shown) that is disposed in the first electric circuit or in a bus bar (not shown) electrically connected to the first electric circuit. Thus, bus bar 42 is screwed and fixed to the first electric circuit.

Thus, bus bar 42, wire harness 39, and bus bar 26 also constitute one of the connection members that electrically connect the first electric circuit to the second electric circuit. Bus bar 42 is a first bus bar that is inserted into opening 10 and is connected to the first electric circuit. Bus bar 26 is a second bus bar connected to the second electric circuit. Wire harness 39 has a first end connected to bus bar 42 and a second end connected to bus bar 26. Mold 28 covers a part of bus bar 42 as shown in FIG. 17.

Figure 17:
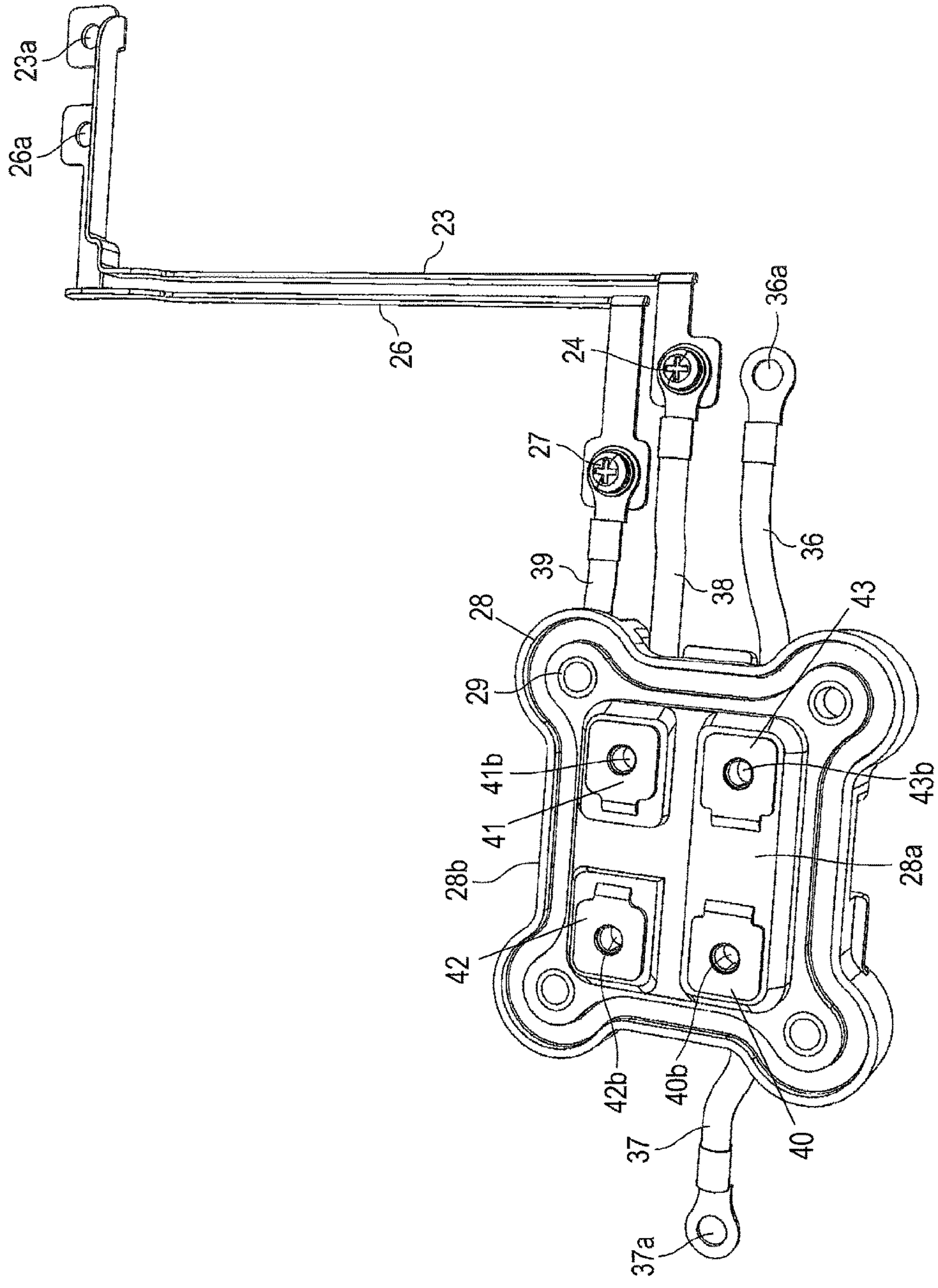
FIG. 17 is an external perspective view showing one example in which a mold is combined with the bus bars and the wire harnesses shown in FIG. 15.
Figure 18:
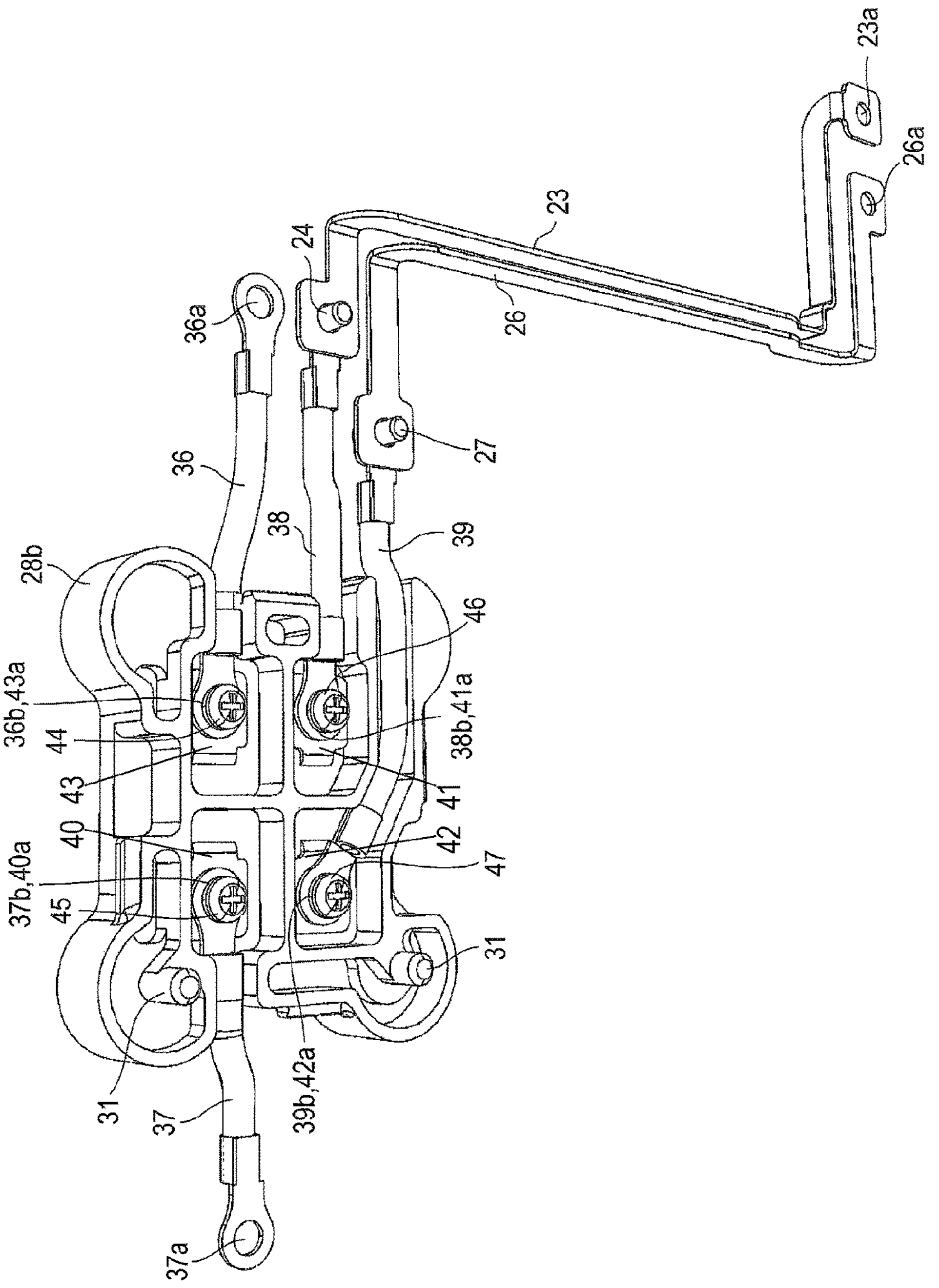
FIG. 18 is an external perspective view showing bottom sides of the bus bars, the wire harnesses, and the mold shown in FIG. 17.

Bus bars 40 to 43 are insert-molded using a resin (for example, polybutylene terephthalate resin or nylon) having an insulation property and heat resistance so as to allow the screwing to through holes 40*a* to 43*a* and to through holes 40*b* to 43*b* (see FIG. 17 and FIG. 18). The shape of mold 28*b* molded by insert-molding is substantially the same as that of mold 28 described in the first exemplary embodiment.

Next, mold 28*b* is described with reference to FIG. 17 and FIG. 18. FIG. 17 is an external perspective view showing the top surface of mold 28*b*. FIG. 18 is an external perspective view showing the bottom surface of mold 28*b*.

Mold 28*b* partially covers bus bars 40 to 43. The covered portions are located between through holes 40*b* and 40*a*, between through holes 41*b* and 41*a*, between through holes 42*b* and 42*a* and between through holes 43*b* and 43*a*, respectively, and include portions inserted into opening 10.

Mold 28*b* is not provided with through holes 30 (see FIG. 8 and FIG. 9) described in the first exemplary embodiment. Although not shown in the drawings, screw receiving member 15 of second box-shaped member 3 is not provided with screw receiving portions 17 (see FIG. 6 and FIG. 7). In the first exemplary embodiment, as described referring FIG. 10, mold 28 is screwed to second box-shaped member 3 with screws 33. In the present exemplary embodiment, however, mold 28*b* is not screwed to second box-shaped member 3.

Specifically, first, positioning protrusions 31 shown in FIG. 18 are inserted into positioning-receiving portions 16 shown in FIG. 6, thereby temporarily fixing the position of mold 28*b*. Here, mold 28*b* can move vertically because it is not fastened to second box-shaped member 3. Screw receiving portions 17 are shown in FIG. 6, but screw receiving portions 17 are not needed in the present exemplary embodiment.

Next, similarly to the first exemplary embodiment, plate-shaped member 2 is mounted on second box-shaped member 3 as shown in FIG. 12. At this time, projection 28*a* is inserted into opening 10 in plate-shaped member 2 to block (or close) opening 10. The positions of through holes 11 in plate-shaped member 2 coincide with the positions of screw receiving portions 29 (see FIG. 17) of mold 28.

After plate-shaped member 2 is mounted on second box-shaped member 3 as shown in FIG. 12, mold 28*b* is screwed to plate-shaped member 2 using screws 35 as shown in FIG. 13. Specifically, by inserting screws 35 into through holes 11 shown in FIG. 12 and into screw receiving portions 29 (see FIG. 17), mold 28*b* is screwed to plate-shaped member 2.

At this time, mold 28*b* is not screwed to second box-shaped member 3 as discussed above. Therefore, tightening screws 35 causes mold 28*b* to be displaced upward so that projection 28*a* projects from plate-shaped member 2. Thus, waterproof sealing member 34 disposed along the outer periphery of mold 28*b* is certainly deformed (or compressed) by plate-shaped member 2 and mold 28*b*. As a result, second surface 2B of plate-shaped member 2 comes into close contact with the top surface of mold 28*b* (surface other than projection 28*a*) without a gap, thereby keeping the waterproof property.

Wire harnesses 36 to 39 having flexibility are disposed between bus bars 40 to 43 and the second electric circuit. Therefore, even when mold 28*b* is displaced upward, wire harnesses 36 to 39 can absorb the positional deviation due to the displacement of mold 28*b*. As a result, occurrence of loads on bus bars 23 and 26 and on the second electric circuit can be suppressed.

As described above, the present exemplary embodiment can produce not only the advantage of the first exemplary embodiment, but also the following effect. In other words, the present exemplary embodiment employs a connection member that connects a bus bar as a first connection member having no flexibility to a wire harness as a second connection member having flexibility. This configuration allows the following functions:

the waterproof property is kept; and the upward lifting of the mold by the screwing of mold 28*b* to plate-shaped member 2 can be accepted. In other words, the occurrence of loads in the bus bars, at a predetermined position of the second electric circuit, and at a predetermined position of casing 100 can be suppressed.

Instead of the bus bars, another first connection member having no flexibility may be employed, for example, a metal rod may be employed. Instead of the wire harnesses, another second connection member having flexibility may be employed, for example, a flexible wiring board may be employed.

Third Exemplary Embodiment

Next, a third exemplary embodiment will be described with reference to FIG. 19 to FIG. 21.

First, the entire configuration of casing 101 in accordance with the present exemplary embodiment is described with reference to FIG. 19. FIG. 19 is an external perspective view showing one example of casing 101.

Casing 101 includes lid member 50 and second box-shaped member 3 (hereinafter referred to as "box-shaped member 3"). The inside of casing 101 is divided into an internal space as a first space and an internal space as a second space by plate-shaped member 2. Plate-shaped member 2 includes frame body 8*a*. Frame body 8*a* also defines a part of casing 101. The first space is internal space 6 (see FIG. 21) of frame body 8*a* for example, and the second space is internal space 14 (see FIG. 6) of box-shaped member 3 for example. Lid member 50 is screwed and fixed to frame body 8*a* with screws 4. Plate-shaped member 2 is screwed and fixed to box-shaped member 3 with screws 5. Lid member 50, plate-shaped member 2, and box-shaped member 3 are made of metal, for example.

Next, lid member 50 is described with reference to FIG. 20. FIG. 20 is an external perspective view showing one example of lid member 50.

Lid member 50 is a plate-shaped member, and is provided with through holes 51 in an outer periphery thereof. Screws 4 shown in FIG. 1 are inserted into through holes 51, respectively.

Next, plate-shaped member 2 is described with reference to FIG. 21. FIG. 21 is an external perspective view showing one example of first surface 2A of plate-shaped member 2.

Plate-shaped member 2 as a partition member separates internal space 6 of frame body 8*a* from internal space 14 (see FIG. 6) of box-shaped member 3. First surface 2A of plate-shaped member 2 faces internal space 6, the second surface (reverse to first surface 2A) of plate-shaped member 2 faces internal space 14. Here, the appearance of the second surface of plate-shaped member 2 is the same as that in FIG. 6 described in the first exemplary embodiment.

Frame body 8*a* is formed on first surface 2A of plate-shaped member 2. Frame body 8*a* may be disposed integrally with first surface 2A, or may be disposed detachably from first surface 2A.

The height of frame body 8*a* is greater than that of frame body 8 (see FIG. 4, for example) described in the first exemplary embodiment. In other words, the length of frame body 8*a* in the sandwiched direction between lid member 50 and box-shaped member 3 is longer than that of frame body 8 in the sandwiched direction between first box-shaped member 1 and second box-shaped member 3. In the present exemplary embodiment, the space surrounded by frame body 8*a*, lid member 50, and plate-shaped member 2 serves as internal space 6.

Figure 21:
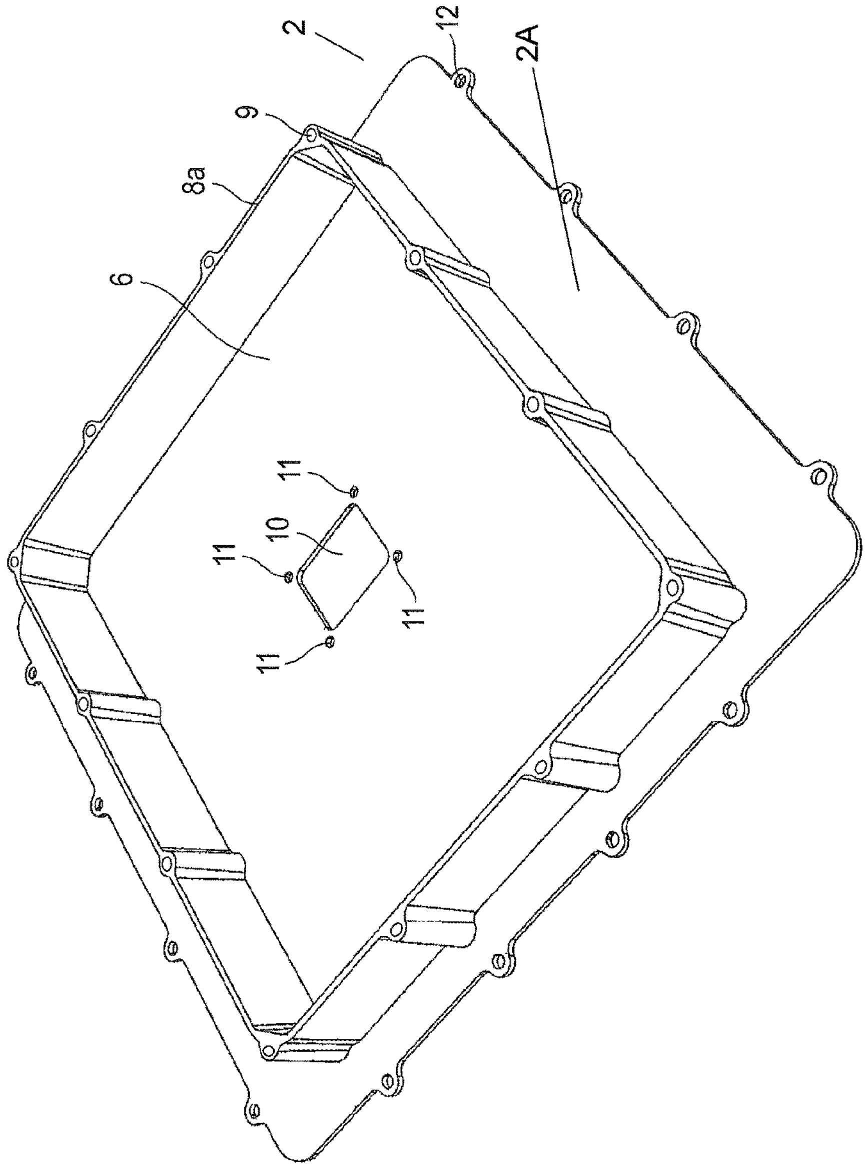
FIG. 21 is an external perspective view showing one example of a first surface of a plate-shaped member of the electrical connection structure in accordance with the third exemplary embodiment of the present disclosure.

A first electric circuit (not shown) is accommodated in internal space 6 shown in FIG. 21, similarly to the first and second exemplary embodiments. The first electric circuit transfers electric power between itself and the second electric circuit (not shown) accommodated in internal space 14 (see FIG. 6) of box-shaped member 3 described later.

In the present exemplary embodiment, for example, the waterproof standard level required for the first electric circuit is lower than that required for the second electric circuit. Therefore, internal space 6 surrounded by frame body 8*a* does not require a waterproof property higher than that of internal space 14 of box-shaped member 3.

Figure 19:
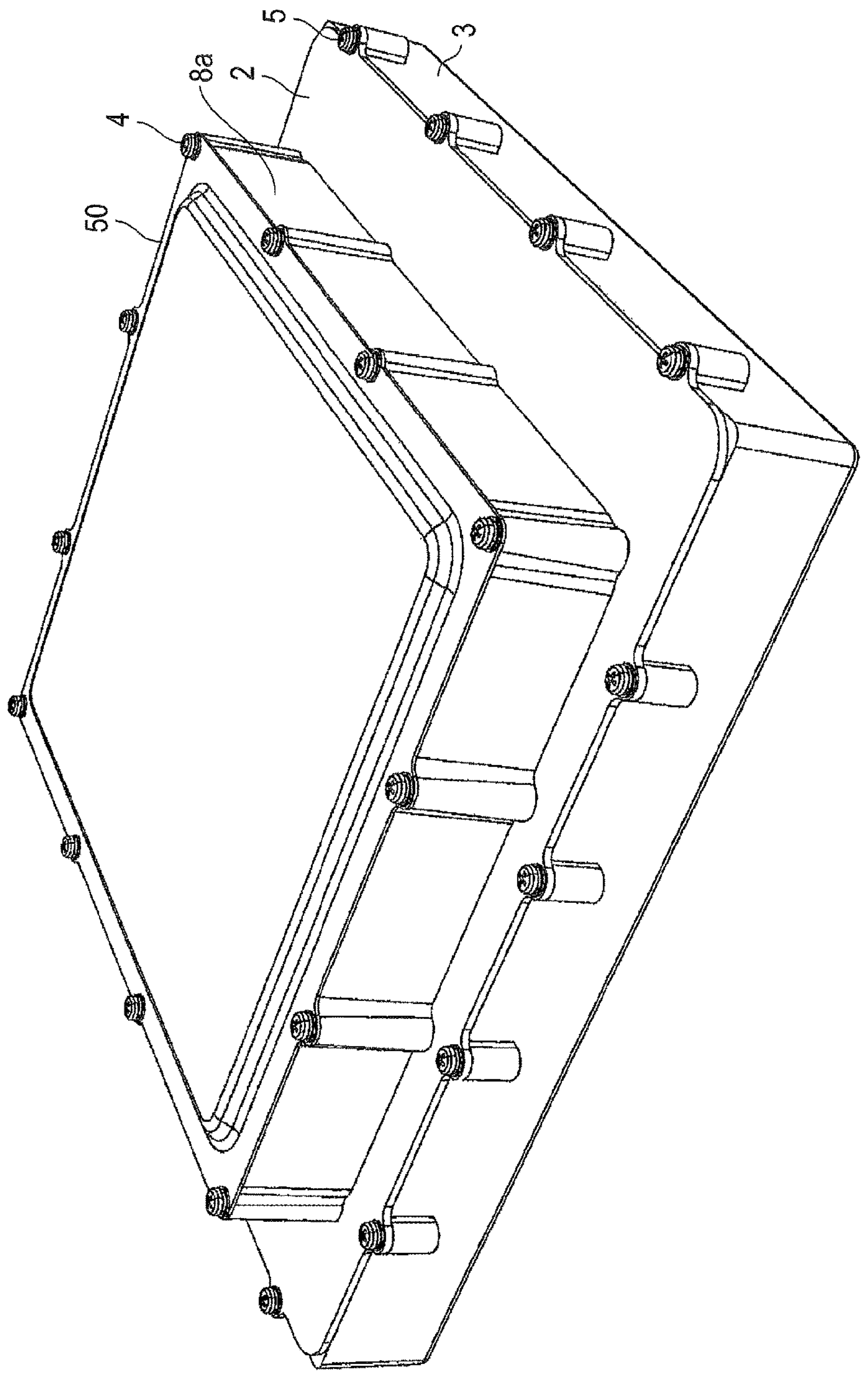
FIG. 19 is an external perspective view showing one example of a casing of an electrical connection structure in accordance with a third exemplary embodiment of the present disclosure.
Figure 20:
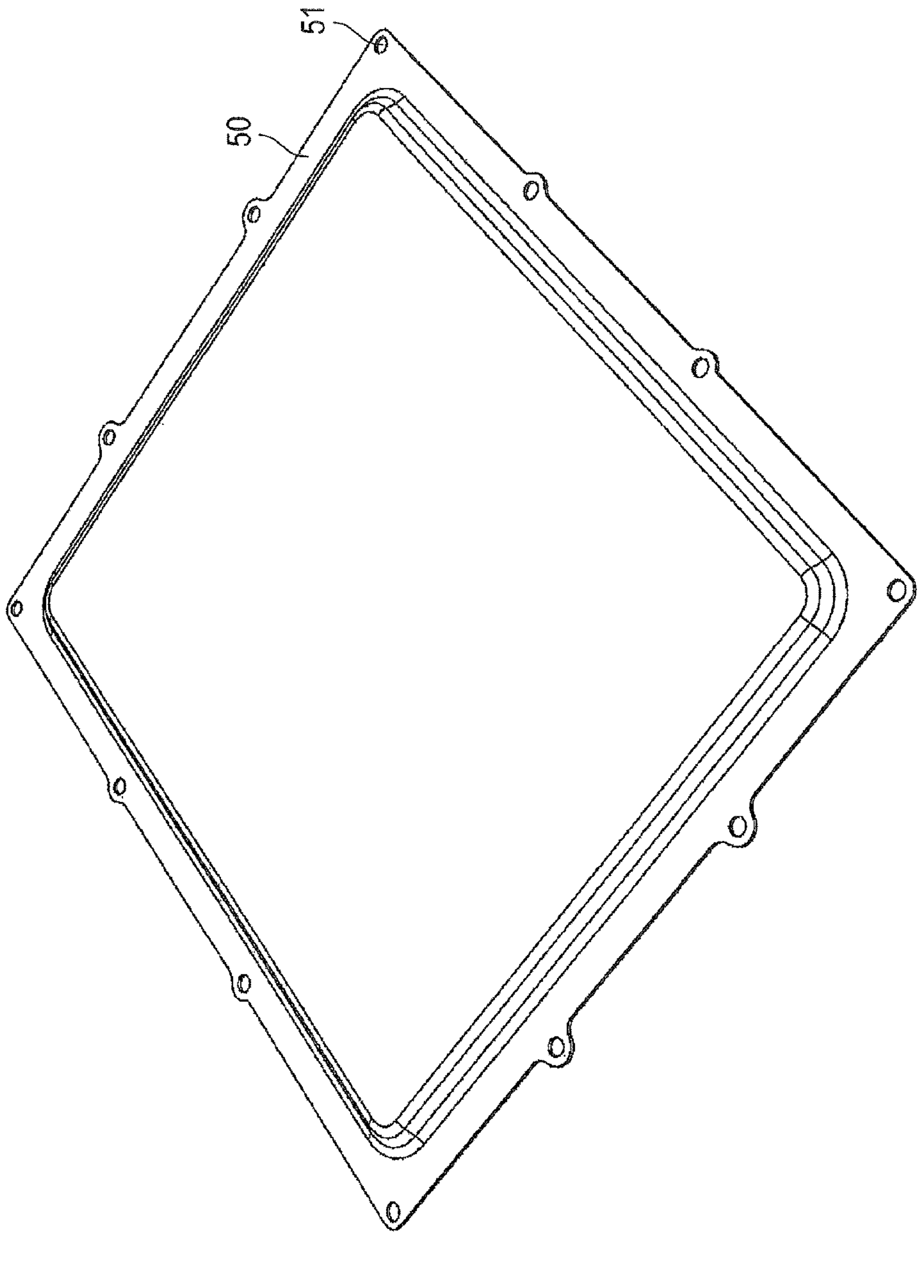
FIG. 20 is an external perspective view showing one example of a lid member of the electrical connection structure in accordance with the third exemplary embodiment of the present disclosure.

As shown in FIG. 21, frame body 8*a* is provided with screw receiving portions (screw holes) 9 into which screws 4 shown in FIG. 19 are inserted. Screws 4 are inserted into screw receiving portions 9 via through holes 51 (see FIG. 20), thereby screwing and fixing lid member 50 to frame body 8*a*. Thus, the opening surface of frame body 8*a* is covered with lid member 50.

As shown in FIG. 21, plate-shaped member 2 is provided with opening 10 at a central portion thereof. Opening 10 penetrates first surface 2A through the second surface of plate-shaped member 2. Plate-shaped member 2A is provided with four through holes 11 at a periphery thereof around opening 10. Through holes 11 penetrate first surface 2A through the second surface of plate-shaped member 2.

As shown in FIG. 21, plate-shaped member 2 is provided with through holes 12 in an outer periphery thereof. Screws 5 shown in FIG. 19 are inserted into through holes 12, respectively.

In the present exemplary embodiment, plate-shaped member 2 including frame body 8*a* is employed. However, the present disclosure is not limited to this. For example, instead of plate-shaped member 2 shown in FIG. 21, a box-shaped member (hereinafter referred to as "third box-shaped member") having an opening top surface may be employed. In that case, the top surface (opening surface) of the third box-shaped member is covered with lid member 50, and the bottom surface of the third box-shaped member covers the top surface (opening surface) of box-shaped member 3. At this time, the bottom surface of the third box-shaped member serves as a partition member for separating the internal space of the third box-shaped member from internal space 14 of box-shaped member 3.

The appearance of box-shaped member 3 is similar to that in FIG. 6. The configuration (for example, bus bars and mold) of internal space 14 of box-shaped member 3 may be the same as the configuration (see FIG. 7 to FIG. 11, for example) of the first exemplary embodiment, or may be the same as the configuration (see FIG. 15 to FIG. 18, for example) of the second exemplary embodiment.

As described above, the present exemplary embodiment can produce the advantage of the first exemplary embodiment or the second exemplary embodiment.

Thus, the first to third exemplary embodiments of the present disclosure have been described. However, the above-mentioned description is one example, and various modifications are allowed. Hereinafter, modified examples are described.

MODIFIED EXAMPLE 1

In each of the exemplary embodiments, the case that predetermined members are screwed to each other has been described as an example. However, the connection method between the predetermined members is not limited to screwing. For example, a bas bur and a wire harness may be calked.

MODIFIED EXAMPLE 2

In each of the exemplary embodiments, the case that the number of bus bars inserted into opening 10 is four has been described as an example. However, the number of bus bars inserted into opening 10 is not limited to this as long as the number is two or more.

MODIFIED EXAMPLE 3

In each of the exemplary embodiments, the case has been described as an example in which the second electric circuit connected to bus bar 20 (or wire harness 36), bus bar 21 (or wire harness 37), bus bar 23, and bus bar 26 is common and the number of second electric circuit is one. However, a plurality of different second electric circuits may be employed. For example, the following configuration may be employed:

- bus bar 20 (or wire harness 36) and bus bar 21 (or wire harness 37) are connected to second electric circuit A; and
- bus bar 23 and bus bar 26 are connected to second electric circuit B different from second electric circuit A.

In each of the exemplary embodiments, the case has been described as an example in which first electric circuit connected to bus bar 20 (or bus bar 43), bus bar 21 (or bus bar 40), bus bar 22 (or bus bar 41), and bus bar 25 (or bus bar 42) is common and the number of first electric circuit is one. However, a plurality of different first electric circuits may be employed. For example, the following configuration may be employed:

- bus bar 20 (or bus bar 43) and bus bar 21 (or bus bar 40) are connected to first electric circuit A; and
- bus bar 22 (or bus bar 41) and bus bar 25 (or bus bar 42) are connected to first electric circuit B different from first electric circuit A.

MODIFIED EXAMPLE 4

In each of the exemplary embodiments, the following case has been described as an example:

- the waterproof standard level required for the second electric circuit is higher than that required for the first electric circuit; and
- internal space 14 of second box-shaped member 3 needs a waterproof property higher than that of internal space 6 of box-shaped member 1.

However, it may be reversed. In other words, the following configuration may be employed:

- the waterproof standard level required for the first electric circuit is higher than that required for the second electric circuit; and
- internal space 6 of box-shaped member 1 needs a waterproof property higher than that of internal space 14 of second box-shaped member 3.

MODIFIED EXAMPLE 5

In each of the exemplary embodiments, the case has been described as an example in which positioning-receiving portions 16 and screw receiving portions 17 are disposed in screw receiving member 15 projecting from the bottom surface of second box-shaped member 3. However, the present disclosure is not limited to this. For example, instead of screw receiving member 15, a tower-shaped member including positioning-receiving portions 16 and screw receiving portions 17 may be employed.

MODIFIED EXAMPLE 6

In the first and second exemplary embodiments, casing 100—one casing—is formed by combining first box-shaped member 1 and second box-shaped member 3. However, the present disclosure is not limited to this. For example, casing 100 may be one casing (one casing that cannot be divided into a plurality of casings) where first box-shaped member 1 and second box-shaped member 3 are not combined. Furthermore, plate-shaped member 2 may be disposed integrally with this casing. The case that the number of plate-shaped member 2 is one has been described as an example in each of the exemplary embodiments, but a plurality of plate-shaped members 2 may be employed.

MODIFIED EXAMPLE 7

In the second exemplary embodiment, the configuration in which wire harness 38 is connected to bus bar 23 and wire harness 39 is connected to bus bar 26 has been described as an example. However, the present disclosure is not limited to this. In FIGS. 15 and 16, for example, wire harnesses may be employed instead of bus bar 23 and bus bar 26.

Alternatively, in FIGS. 15 and 16, for example, the following configuration may be employed:

wire harnesses are used instead of bus bar 23 and bus bar 26; and bus bars (for example, bus bars 22 and 25 shown in FIG. 7) are used instead of wire harness 38 and bus bar 41 and instead of wire harness 39 and bus bar 42. In other words, wire harnesses having flexibility needs to be interposed between insert-molded bus bars 40 to 43 and the second electric circuit, respectively.

MODIFIED EXAMPLE 8

In each of the exemplary embodiments, the case that one opening 10 is disposed in plate-shaped member 2 has been described as an example. However, the present disclosure is not limited to this. For example, two openings 10 may be disposed, and mold 28 may be disposed for each of openings 10. However, it is preferable that the number of openings 10 is smaller than the number of bus bars (20, 21, 22, and 25).

MODIFIED EXAMPLE 9

In the third exemplary embodiment, the case that frame body 8*a* defines four side surfaces of internal space 6 has been described as an example. However, the present disclosure is not limited to this. For example, the configuration may be employed in which the height of only a part of the frame body is increased and this part defines only one side surface of internal space 6. In this case, a member in which one side surface of first box-shaped member 1 of the first exemplary embodiment is opened is disposed so as to cover the remaining three side surfaces and the top surface. Here, it is preferable that a connector for connecting the first electric circuit to an electric circuit out of the casing is disposed in the frame body defining the side surfaces of internal space 6.

INDUSTRIAL APPLICABILITY

The present disclosure is applicable to the whole of the technology for electrically interconnecting electric circuits.

REFERENCE MARKS IN THE DRAWINGS

1 first box-shaped member
2 plate-shaped member
2A first surface
2B second surface
3 second box-shaped member (box-shaped member)
3B bottom surface
4, 5, 24, 27, 33, 35, 44, 45, 46, 47 screw
6, 14 internal space
7, 11, 12, 20*a*, 20*b*, 21*a*, 21*b*, 22*a*, 22*b*, 23*a*, 23*b*, 25*a*, 25*b*, 26*a*, 26*b*, 30, 36*a*, 36*b*, 37*a*, 37*b*, 38*a*, 38*b*, 39*a*, 39*b*, 40*a*, 40*b*, 41*a*, 41*b*, 42*a*, 42*b*, 43*a*, 43*b*, 51 through hole
8, 8*a* frame body
9, 17, 19, 29 screw receiving portion
10 opening
13, 18 groove
15 screw receiving member
16 positioning-receiving portion
20, 21, 22, 23, 25, 26, 40, 41, 42, 43 bus bar
28, 28*b* mold
28*a*, 28P projection
31 positioning protrusion
32, 34 waterproof sealing member
36, 37, 38, 39 wire harness
50 lid member
100, 101 casing

The invention claimed is:

1. An electrical connection structure comprising:

a partition member provided with an opening;

a casing having an inside divided into a first space and a second space by the partition member;

a plurality of connection members configured to electrically couple a first electric circuit accommodated in the first space with a second electric circuit accommodated in the second space; and a mold blocking the opening in the partition member, wherein the partition member includes:

a first surface facing the first space; and a second surface reverse to the first surface and facing the second space, the opening penetrates the first surface and the second surface, the plurality of connection members extend from the second space to the first space via the mold, and a periphery of a surface, of the mold, facing the second surface is in close contact with the second surface via a waterproof sealing member.

2. The electrical connection structure according to claim 1, wherein the mold includes a projection blocking the opening and penetrating the partition member.

3. The electrical connection structure according to claim 1, wherein the partition member is further provided with a through hole, the mold includes a screw receiving portion, and the electrical connection structure further comprises a screw inserted into the through hole in the partition member and into the screw receiving portion of the mold, the screw fixing the mold to the partition member.

4. The electrical connection structure according to claim 3, wherein the through hole in the partition member is disposed around the opening, and the screw receiving portion of the mold is disposed on the surface facing the second surface.

5. The electrical connection structure according to claim 1, wherein the mold is provided with a through hole, the casing includes a screw receiving portion, and the electrical connection structure further comprises a screw inserted into the through hole in the mold and into the screw receiving portion of the casing, the screw fixing the mold to the casing.

6. The electrical connection structure according to claim 5, wherein the mold includes a projection projecting from a side surface of the mold, the through hole in the mold is disposed in the projection, and the screw receiving portion of the casing projects from a bottom surface of the second space of the casing.

7. The electrical connection structure according to claim 1, wherein the mold includes a positioning protrusion, and the casing includes a positioning receiving portion into which the positioning protrusion is inserted.

8. The electrical connection structure according to claim 1, wherein the plurality of connection members is a plurality of bus bars, and a length of at least one of the plurality of bus bars is different from lengths of other bus bars of the plurality of bus bars.

9. The electrical connection structure according to claim 1, wherein the opening is disposed in a central portion of the partition member.

10. The electrical connection structure according to claim 1, wherein each of the plurality of connection members includes:

a first connection member having a flexibility; and a second connection member having no flexibility and coupled to the first connection member.

11. The electrical connection structure according to claim 10, wherein the first connection member is a wire harness, and the second connection member is a bus bar.

12. The electrical connection structure according to claim 11, wherein the bus bar includes:

a first bus bar inserted into the opening; and a second bus bar to be coupled to the second electric circuit, the wire harness includes:

a first end coupled to the first bus bar; and a second end coupled to the second bus bar, and the mold covers the first bus bar.

13. The electrical connection structure according to claim 10, wherein the mold includes a projection blocking the opening and penetrating the partition member.

14. The electrical connection structure according to claim 10, wherein the partition member is further provided with a through hole, the mold includes a screw receiving portion, and the electrical connection structure further comprises a screw inserted into the through hole in the partition member and into the screw receiving portion of the mold, the screw fixing the mold to the partition member.

15. The electrical connection structure according to claim 14, wherein the through hole in the partition member is disposed around the opening, and the screw receiving portion of the mold is disposed on the surface facing the second surface.

16. The electrical connection structure according to claim 1, wherein a waterproof standard level required for the second electric circuit is different from a waterproof standard level required for the first electric circuit.

* * * * *